US010543597B1

(12) United States Patent
Baroudi et al.

(10) Patent No.: US 10,543,597 B1
(45) Date of Patent: *Jan. 28, 2020

(54) TASK ASSIGNMENT METHOD FOR WHEELED ROBOT NETWORK

(71) Applicant: KING FAHD UNIVERSITY OF PETROLEUM AND MINERALS, Dhahran (SA)

(72) Inventors: Uthman Baroudi, Dhahran (SA); Mohammed Mahmoud Al-Shaboti, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 0 days.

This patent is subject to a terminal disclaimer.

(21) Appl. No.: 16/571,285

(22) Filed: Sep. 16, 2019

Related U.S. Application Data

(63) Continuation of application No. 15/730,000, filed on Oct. 11, 2017, now Pat. No. 10,456,912.

(Continued)

(51) Int. Cl.
*B25J 9/16* (2006.01)

(52) U.S. Cl.
CPC ........... *B25J 9/1661* (2013.01); *B25J 9/1602* (2013.01); *G05B 2219/39117* (2013.01); *G05B 2219/39167* (2013.01); *Y10S 901/06* (2013.01)

(58) Field of Classification Search
CPC ..... B25J 9/1602; B25J 9/1661; Y10S 901/06; G05B 19/41865; G05B 2219/39117;
(Continued)

(56) References Cited

U.S. PATENT DOCUMENTS

2005/0256610 A1  11/2005  Orita
2010/0217438 A1   8/2010  Kawaguchi et al.
(Continued)

FOREIGN PATENT DOCUMENTS

CN  105068550 A  11/2015
CN  105843227 A   8/2016

OTHER PUBLICATIONS

Fang Tang, et al., "A Complete Methodology for Generating Multi-Robot Task Solutions using ASyMTRe-D and Market-Based Task Allocation", Proceedings of IEEE International Conference on Robotics and Automation, 2007, 8 pages.
(Continued)

*Primary Examiner* — Dale Moyer
(74) *Attorney, Agent, or Firm* — Oblon, McClelland, Maier & Neustadt, L.L.P.

(57) ABSTRACT

A dynamic multi-objective task allocation system within robotic networks that assigns tasks in real-time as they are detected, the system including a sensing device that detects a trigger event, the trigger event being associated with a task to be performed, and transmits a broadcast signal to a designated robotic network, the robotic network including one or more robots, the broadcast signal including information associated with the task to be performed, the trigger event, the task to be performed, and a location where the task is to be performed; and a distribution robot that receives broadcast signal from the sensing device, assigns itself a self-score associated with performing the task, transmits, to one or more receiving robots within the robotic network, a request for submission of an assessment score of each one of the one or more robots, and determines which robot is assigned to perform the task.

6 Claims, 21 Drawing Sheets

Related U.S. Application Data

(60) Provisional application No. 62/504,766, filed on May 11, 2017.

(58) Field of Classification Search
CPC .......... G05B 2219/39146; G05B 2219/39167; G05B 2219/39252; G05B 2219/40417; G05B 2219/40451
See application file for complete search history.

(56) References Cited

U.S. PATENT DOCUMENTS

| | | |
|---|---|---|
| 2014/0074339 A1 | 3/2014 | Casado et al. |
| 2015/0367513 A1 | 12/2015 | Gettings |
| 2019/0070725 A1 | 3/2019 | Buerger |

OTHER PUBLICATIONS

Qiao Cheng, et al., "An Auction-based Multiple Constraints Task Allocation Algorithm for Multi-UAV System", International Conference on Cybernetics, Robotics and Control, Aug. 19-21, 2016, pp. 1-5.

Maitreyi Nanjanath, et al., "Dynamic Task Allocation for Robots via Auctions", Proceedings of IEEE International Conference on Robotics and Automation, 2006, 6 pages.

Gerkey, et al., "Sold!: Auction methods for multirobot coordination." IEEE transactions on robotics and automation 18.5 (2002): 758-768. (Year: 2002).

Robot R1 wins initial bid and every bid thereafter based on synergy considerations alone.

TASK ASSIGNMENT METHOD FOR WHEELED ROBOT NETWORK

CROSS-REFERENCE TO RELATED APPLICATIONS

The present application is a Continuation of Ser. No. 15/730,000, now allowed, having a filing date of Oct. 11, 2017 and which claims benefit of priority to U.S. provisional application No. 62/504,766, filed on May 11, 2017 which is incorporated herein by reference in its entirety.

BACKGROUND

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present disclosure.

Robotic networks are progressively used more and more in industrial and scientific applications. Robotic networks attract researchers' attention, because of their ability to incorporate multiple technological platforms, including computational, sensing, communications and movement platforms. Additionally, such networks are suitable to be used in a wide range of applications where human intervention is limited or denied. Such applications include, for example, rescue operations, surveillance, logistic and humanitarian demining, as well as applications where there are economic benefits for using mobile robots such as farming or production line applications. Advantages of using robotic networks include flexibility of modifying the robotics network to match different application scenarios, robustness of multi-robot system against failure and parallelism operation, which leads to a time efficient system.

A team of robots is able to map an area and identify unsafe areas. The team can locate tasks either by itself if the robots are equipped with appropriate sensors or with the help of an external system, such as a wireless sensor network (WSN). The task could be carrying goods in a warehouse application, cleaning in a cleaning operation scenario, or finding victims in a surveillance application. In many scenarios, task locations and requirements are not known beforehand because they emerge as needed in the area. Hence, an offline task assignment approach is not a feasible solution. Therefore, an on-line distributed task allocation approach is needed for such dynamic scenarios.

The problem of assigning a set of tasks to a set of robots to optimize certain metrics is called multi-robot task allocation (MRTA), and it is considered to be one of the main challenges in multi-robot systems (MRS). Furthermore, it is more challenging if tasks must be assigned in a distributed manner as they appear in real-time.

There are different MRTA approaches which can be classified into three major categories: centralized approaches, market-based approaches, and behavior-based approaches. Centralized approaches are suitable for a small number of robots in a static environment. They suffer from a single point of failure and high communication overhead, and they respond slowly to local changes. In contrast, fully distributed approaches, such as behavior-based approaches are robust to failures, flexible, and require less computational and communication resources; however, they work on local optimal solutions, which do not necessarily aggregate to produce the globally optimal solution, and thus, they yield suboptimal solutions.

The market-based/auction-based approach, one of the most popular algorithms of MRTA, is considered to be the mid-point between fully centralized and fully distributed approaches. It works in a similar manner as an auction process in the market, where an auctioneer opens an auction and then bidders submit their offers, with the auctioneer granting the item to the highest bidder. In the market-based approach, the bid is computed by each robot as a function of its utility in performing a task. There are primarily two common types of auctions: single-task auctions and combinatorial auctions. In a single-task auction, there is one task, and it is granted to the highest bidder. In a combinatorial auction, multiple tasks are offered in one auction, and bidders can bid on any subset of the offered tasks based on the robots' decision.

The problem of the single-task approach is that it does not consider the synergy among tasks, which leads to a suboptimal solution. Synergy is a term used to describe the relationship between tasks; tasks have positive synergy if the total cost of executing them by one robot is less than the total cost if they are executed by more than one robot. In contrast, because the combinatorial auction allows robots to bid on a subset of tasks, robots can bid on tasks that have positive synergy, and thus, it produces a better solution. However, the combinatorial auction requires high computational resources because the number of possible bundles increases exponentially with the number of tasks. Sequential single-item (SSI) auctions are an alternative to combinatorial auctions. In SSI auctions, robots bid on all unallocated tasks by the minimum cost increase in the sum of the minimum path to visit the assigned tasks. The robot with the smallest bid wins a task, and then, the bidding process begins again for the remaining unallocated tasks. After all tasks are allocated, robots compute the minimum path to their tasks and move accordingly.

Accordingly, there is a need for an online distributed multi-objective task allocation system (DYMO Action) that assigns the tasks emerging scenario which provides immunity against single point failures, utilizes low processing/computational costs, and performs local and global optimal solutions that takes into consideration task synergy and quality considerations for tasks and performing robots.

SUMMARY

The foregoing paragraphs have been provided by way of general introduction and are not intended to limit the scope of the following claims. The described embodiments, together with further advantages, will be best understood by reference to the following detailed description taken in conjunction with the accompanying drawings.

According to an exemplary embodiment, a dynamic multi-objective task allocation system within a robotic network may be deployed to assign one or more tasks in real-time as the tasks are detected, the dynamic multi-objective task allocation system comprising a sensing device including circuitry configured to detect a trigger event, the trigger event associated with a task to be performed, and transmit a broadcast signal to a designated robotic network, the robotic network including one or more robots, the broadcast signal including information associated with the task to be performed, the information including the trigger event, the type of task to be performed, and a location where the task is to be perfoi fied; a distribution robot within the robotic network, the distribution robot including circuitry configured to receive the broadcast signal from the sensing device, perform a self-assessment associated with performing the task and assign itself a self-assessment score, transmit, to one or more receiving robots within the robotic network, a request for submission of an assessment score of each one of the one or more robots, the assessment score being a self-generated score generated at each receiving robot and reflecting a score of each receiving robot's ability to perform the task, the assessment score based on a quality metric, a distance metric, and a workload metric, receive one or more submissions from the one or more robots, the one or more submissions including the assessment score, compare the received one or more assessment scores with the self-assessment score, and select an assessment score, the selected assessment score being the lowest score from among the self-score and the one or more assessment scores.

In one embodiment, the distribution robot circuitry may further transmit a selection notification to one of the one or more receiving robots, the notification indicating that the one of the one or more receiving robots is selected to perform the task. Additionally, the dynamic multi-objective task allocation system may further include a receiving robot within the robotic network, the receiving robot including circuitry configured to receive the request for submission from the distribution robot, generate the assessment score based on the quality metric, the distance metric and the workload metric, and transmit the assessment score to the distribution robot.

In yet another embodiment, the receiving robot circuitry may further determine an activity status of the receiving robot within a predetermined period of time before receiving the request for submission from the distribution robot, and return to the determined activity after transmitting the assessment score, wherein the receiving robot returns to an idle state in response to the determined activity being an idle activity, and the receiving robot returns to a task performing state in response to the determined activity being a task performing activity. The receiving robot circuitry is further configured to in response to receiving the selection notification proceed immediately to perform the task, when the determined activity status is the idle sate, and schedule the task, within a schedule matrix, when the determined activity status is the task performing state. Furthermore, a priority of the scheduled task is based on a ranking of the scheduled task within the schedule matrix. Additionally, the ranking may be based on a distance between a current task at a time of completion and the scheduled task.

In yet another exemplary embodiment, the distribution robot is a different robot for each received broadcast signal and the quality metric includes a quality score associated with the robot and a quality score associated with the task. The Quality score associated with the robot is determined by $$R_q^i = \frac{\sum_{j=1}^{l} q_j}{l}$$

where l is the number of tasks assigned to robot $R_i$, and $q_j$ is a task quality requirement. Furthermore, the assessment score is determined by $$C_{ij} = W_d * \bar{d}_{ij} + W_q * \bar{q}_{ij} + W_t * l_i$$

where $W_d$, $W_q$, and $W_t$ are weights that sum up to one and where $d_{ij}$ $q_{ij}$ and $l_i$ are normalized values (divided by a maximum possible value) of the distance, quality and load.

It is also noted that Dij without the bar is the minimum distance between the task and either the robot or any of its unexecuted assigned tasks. Qij without the bar is the difference in quality between robot and task. And Li is the current load of the robot. Accordingly, these values are then normalized in determining the cost. is a maximum distance between any two points within an area including the receiving robot and the task, $q_{ij}$ is a maximum deviation value between the receiving robot's quality level and the task quality level, and $l_i$ is a maximum measured deviation between the total load of the robot and the load required for performing the task In another exemplary embodiment, a dynamic multi-objective task allocation method within a robotic network is used to assign one or more tasks in real-time as the tasks are detected, the dynamic multi-objective task allocation method including detecting, with a sensing device, a trigger event, the trigger event associated with a task to be performed; and transmitting a broadcast signal to a designated robotic network, the robotic network including one or more robots, the broadcast signal including information associated with the task to be performed, the information including the trigger event, the type of task to be performed, and a location where the task is to be performed; receiving, at a distribution robot within the robotic network, the broadcast signal from the sensing device; performing, at the distribution robot, a self-assessment associated with performing the task and assigning itself a self-assessment score; transmitting, by the distribution robot, to one or more receiving robots within the robotic network, a request for submission of an assessment score of each one of the one or more robots, the assessment score being a self-generated score generated at each receiving robot and reflecting a score of each receiving robot's ability to perform the task, the assessment score based on a quality metric, a distance metric, and a workload metric; receiving one or more submissions from the one or more robots, the one or more submissions including the assessment score; comparing the received one or more assessment scores with the self-assessment score; and selecting an assessment score, the selected assessment score being the lowest score from among the self-score and the one or more assessment scores.

The dynamic multi-objective task allocation method further comprises transmitting, by the distribution robot, a selection notification to one of the one or more receiving robots, the notification indicating that the one of the one or more receiving robots is selected to perform the task. Additionally, the dynamic multi-objective task allocation method further comprises receiving, at a robot within the robotic network, the request for submission from the distribution robot, generating the assessment score based on the quality metric, the distance metric and the workload metric, and transmitting the assessment score to the distribution robot.

In yet another embodiment, the dynamic multi-objective task allocation method further comprises determining, at the receiving robot, an activity status of the receiving robot within a predetermined period of time before receiving the request for submission from the distribution robot; and returning to the determined activity after transmitting the assessment score, wherein the receiving robot returns to an idle state in response to the determined activity being an idle activity, and the receiving robot returns to a task performing state in response to the determined activity being a task performing activity.

Furthermore, the dynamic multi-objective task allocation method further comprises, in response to receiving the selection notification from the distribution robot, proceed, at the receiving robot, immediately to perform the task, when the determined activity status is the idle sate, and scheduling the task, within a schedule matrix, when the determined activity status is the task performing state. Additionally, a priority of the scheduled task is based on a ranking of the scheduled task within the schedule matrix.

In an exemplary embodiment, a non-transitory computer-readable medium having computer-readable instructions thereon is employed, which when executed by a computer cause the computer to perform a dynamic multi-objective task allocation method within a robotic network to assign one or more tasks in real-time as the tasks are detected, the dynamic multi-objective task allocation method comprising detecting, with a sensing device, a trigger event, the trigger event associated with a task to be performed; and transmitting a broadcast signal to a designated robotic network, the robotic network including one or more robots, the broadcast signal including information associated with the task to be performed, the information including the trigger event, the type of task to be performed, and a location where the task is to be performed; receiving, at a distribution robot within the robotic network, the broadcast signal from the sensing device; performing, at the distribution robot, a self-assessment associated with performing the task and assigning itself a self-assessment score; transmitting, by the distribution robot, to one or more receiving robots within the robotic network, a request for submission of an assessment score of each one of the one or more robots, the assessment score being a self-generated score generated at each receiving robot and reflecting a score of each receiving robot's ability to perform the task, the assessment score based on a quality metric, a distance metric, and a workload metric; receiving one or more submissions from the one or more robots, the one or more submissions including the assessment score; compare the received one or more assessment scores with the self-assessment score; and selecting an assessment score, the selected assessment score being the lowest score from among the self-score and the one or more assessment scores.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
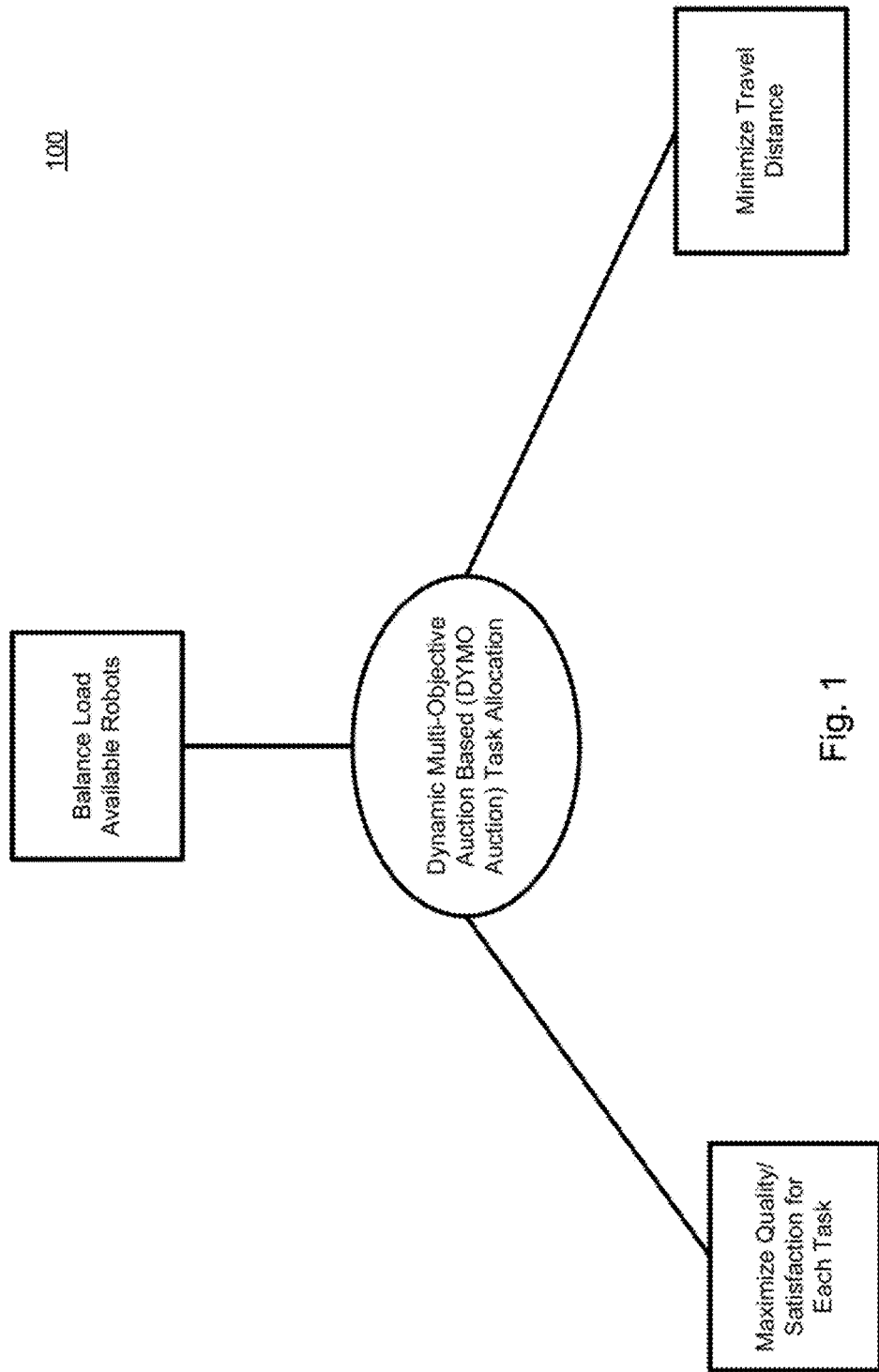
FIG. 1 includes an exemplary illustration of objectives and improvements to a robotic network system based on DYMO Auction task allocation.

Referring now to the drawings, wherein like reference numerals designate identical or corresponding parts throughout the several views.

FIG. 1 includes an exemplary illustration of objectives and improvements to a robotic network system based on DYMO Auction task allocation. As will be illustrated herein, DYMO auction task allocation achieves a balance load for all available robots so that the robotic network is not left with an overused robot on one end and an underused robot on the other. By taking into account the load of each robot, and particularly the winning robot, an overall balance within the robotic network can be achieved.

Furthermore, the quality and performance for each task must be maximized. In this sense, it is ideal to match the appropriate robot having the requisite capabilities with the appropriate task to ensure timely completion of the task. To this end, a quality parameter is used as a decision making factor that enables DYMO auction task allocation to emphasis the quality of the task to ensure the right matching robot is selected, as will be further described herein.

Additionally, travel distance may be minimized based on a weighted factor assigned to each task for each distance traveled. For example, a task allocation may be allocated a distance weighted factor of, for example, 0.46 indicating the high priority of traveled distance in performing the task. It is recognized that the above weighted factor is an exemplary factor and other factors may be allocated based on different priorities for traveled distance.

Figure 2A:
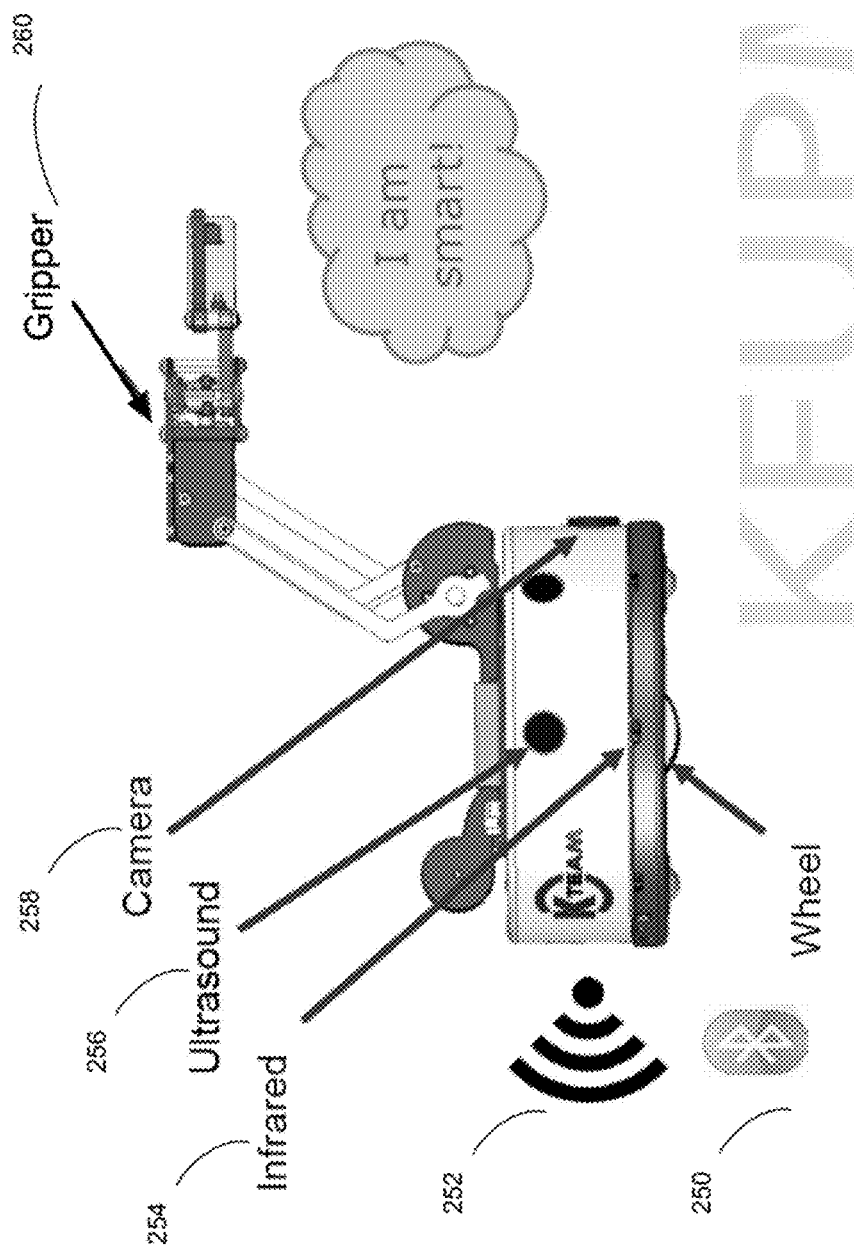
FIG. 2A describes a robotic network configuration according to an exemplary embodiment.

FIG. 2A includes an exemplary illustration of a robotic machine that receives announcements and bids on tasks to be performed. A robot 200 may be used as a platform housing a plurality of sensors and mechanical devices each designed to perform a specific task. For example, robot 200 may include wireless communication capabilities such as Bluetooth 250 and WiFi 252 capabilities, and may further include infrared 254, ultrasound 256 and camera 258 sensors. These sensors may be used for navigational purposes and/or analysis purposes. For example, using the camera 258 as an illustration, camera 258 may be used to detect path obstacles in order to continue a previous motion. Alternatively, the robot 200 may be tasked to capture a multimedia stream using the camera 258. Such multimedia stream may include, but is not limited to, audio, video and still frame captures. Robot 200 may further include mechanical gripper 260 to perform specific physical tasks, such as grabbing or carrying an object. Robot 200 may include other mechanical platforms for performing a wide array of physical tasks based on the activity and objective robot 200 may tasked to do or equipped to carry. For example, robot 200 may be deployed to perform demining operations. Accordingly, the technical and physical capabilities of robot 200, including sensor capabilities and communication capabilities are a part of a quality factor to be considered in the task allocation as will be further discussed herein.

Figure 2B:
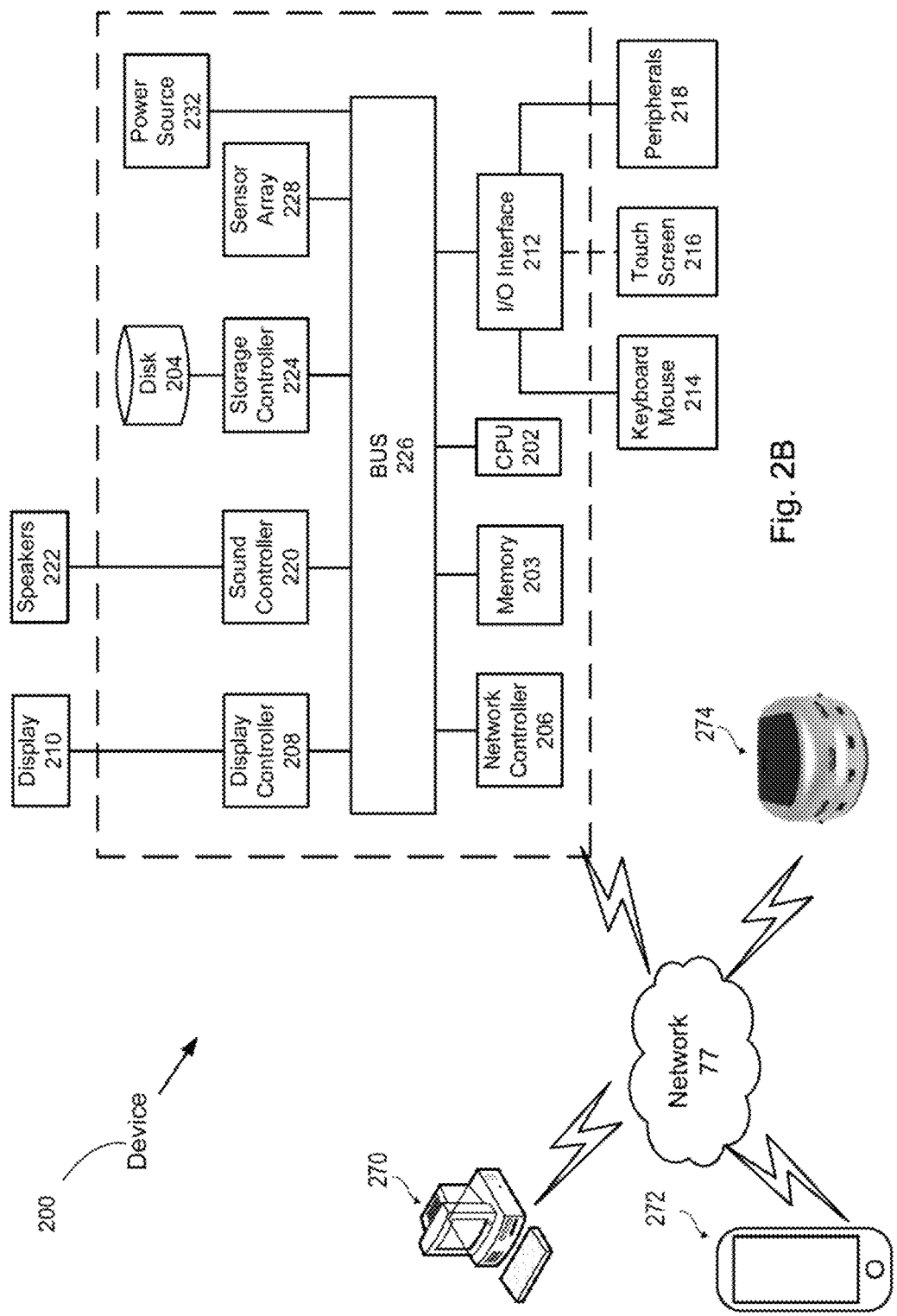
FIG. 2B includes an exemplary illustration of a robotic machine that receives announcements and bids on tasks to be performed.

FIG. 2B describes a device configuration within a robotic network according to an exemplary embodiment. The task allocation system may include robot 200 that includes a CPU 202 which performs control and processing calculations further discussed hereinafter. The process data, instructions, bid processing algorithms, and the like may be stored in memory 203. These processes and instructions may also be stored on a storage medium disk 204 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the device communicates, such as a server or computer. The memory 203 may store application program instructions and store default and update instructions for performing specific tasks as required by a received bid.

In one embodiment, the memory 203 may store application programs used to implement aspects of the functionality of the task allocation system described herein. The memory 203 may also store raw data, recorded data, and/or calculated data, downloaded data and/or as explained in further detail below, the memory 203 may act as a data storage buffer. The memory 203 may include both read only memory and random access memory, and may further include memory cards or other removable storage devices. The memory 203 may store data in memory locations of predetermined size, i.e., bytes, words, sectors, and/or blocks, such that only a certain quantity of data may be saved for a particular application of the CPU 202.

Further, the present advancements may be provided as a utility application or component of an operating system, or combination thereof, executing in conjunction with CPU 202 and an operating system such as Microsoft Windows 7, UNIX, Solaris, LINUX, Apple MAC-OS and other systems known to those skilled in the art.

CPU 202 may be a Xenon or Core processor from Intel of America or an Opteron processor from AMD of America, or may be other processor types that would be recognized by one of ordinary skill in the art. Alternatively, the CPU 202 may be implemented on an FPGA, ASIC, PLD or using discrete logic circuits, as one of ordinary skill in the art would recognize. Further, CPU 202 may be implemented as multiple processors cooperatively working in parallel to perform the instructions of the inventive processes described above.

Robot 200 also includes a network controller 206: such as an Intel Ethernet PRO network interface card from Intel Corporation of America, for interfacing with network 77. Network controller 206 enables CPU 202 to wirelessly communicate with other components of the task allocation system and or robots, computers, and mobile devices. CPU 202 may communicate with other components over a per-sonal area. network or local area. network using, for example, one or more of the following protocols: ANT, ANT+ by Dynastream innovations, Bluetooth, Bluetooth Low Energy Technology, BlueRobin, or suitable wireless personal or local area network protocols. Other known communication protocols suitable for a task allocation system may also be used. in one exemplary embodiment, network controller 206 is low-power controller and may be a two-way communication controller 206, or a one-way transmitter or a one-way receiver.

As can be appreciated, the network 77 can be a public network, such as the internet, or a private network. such as an LAN or WAN network, or any, combination thereof and can also include PSTN or ISDN sub-networks. The network 77 can also be wired, such as an Ethernet network, or can be wireless such as a cellular network including EDGE, 3G- and 4G wireless cellular systems. The wireless network can also be Bluetooth, or any other wireless form of communication that is known.

Robot 200 may further include a display controller 208, such as a NVIDIA GeForce GTX or Quadro graphics adaptor from NVIDIA Corporation of America for interfacing with display 210, such as a Hewlett Packard HPL2445w LCD monitor. A general purpose I/O interface 212 interfaces with a keyboard and/or mouse 214 as well as a touch screen panel 216 on or separate from display 210, General purpose I/O interface also connects to a variety of peripherals 218 including printers and scanners, such as an OfficeJet or DeskJet from Hewlett Packard if need be.

A sound controller 220 may also be provided in robot 200, such as Sound Blaster X-Fi Titanium from Creative, to interface with speakers/microphone 222 thereby providing sounds and/or music. Sound controller 220 allows a task allocation system 200 to receive audio signals that turn into text and further text that is converted to speech to be output to a user to correct the user if they pronounce the verses incorrectly, as further discussed hereinafter.

The general purpose storage controller 224 connects the storage medium disk 204 with communication bus 226, which may be an ISA, EISA, VESA, PCI, or similar, for interconnecting all of the components of the device. A description of the general features and functionality of the display 210, keyboard and/or mouse 214, as well as the display controller 208, storage controller 224, network controller 206, sound controller 220, and general purpose I/O interface 212 is omitted herein for brevity as these features are known.

An array of sensors may be incorporated within device 201, such as sensor array 228, or may be incorporated outside the robot. Sensor array 228 may include sensors that are not incorporated in robot 200 and as such would need to communicate either via wire, or wirelessly through network 77. Such devices may be integrated based on the types of missions robot 200 would typically undertake. For example, robot 200 may routinely take on search and rescue operations. Accordingly, robot 200 may be equipped with an array of sensors that are specific to that operation.

Robot 200 may be powered by power source 232. The power source 232 provides power to all elements of device 201. In one embodiment, the power source 232 may be a battery. The power source may also be built into the CPU 202 or removable from the CPU 202, and may be rechargeable or non-rechargeable. In an exemplary embodiment, the power source 232 may be recharged by a cable attached to a charging source, such as a universal serial bus ("USB"), FireWire, Ethernet, Thunderbolt, headphone cable, or a specially designed cable attached to a personal computer. The power source 232 may also be recharged by inductive charging, which uses an electromagnetic field to transfer energy from an inductive charger to the power source 232 when the two are brought in close proximity. Thus, the power source need not be plugged into one another via a cable. A docking station may also be used to facilitate charging.

Robot 200 may also include a timer (not shown). The timer may be a clock that tracks absolute time and/or determines elapsed time. In some exemplary embodiments, the timer may be used to timestamp certain data records, such that the time that certain data was measured or recorded may be determined and various timestamps of various pieces of data may be correlated with one another. The timer may further be used to time stamp events that the task allocation system is in session and that a bidding process us underway, such that the information about the bidding habits of the each robot 200 may be collected and analyzed.

Robot 200 may further include a data port as part of peripherals 218. The data port facilitates information transfer to and from the CPU 202 and may be, for example, a USB port. The data port can additionally or alternatively facilitate power transfer to power source 232, in order to charge power source 232.

Within the task allocation system, robot 200 may communicate with other devices, including, for example, computing device 270, mobile device 272 or other robots, such as robot 274. As will be discussed further herein, computing device 270 may be a server issuing a request for a task to be accomplished. Such a task is then passed on to an auctioneer device to perform the auction. The auctioneer device may be mobile device 272, robot 200 or other robot 274.

Figure 3:
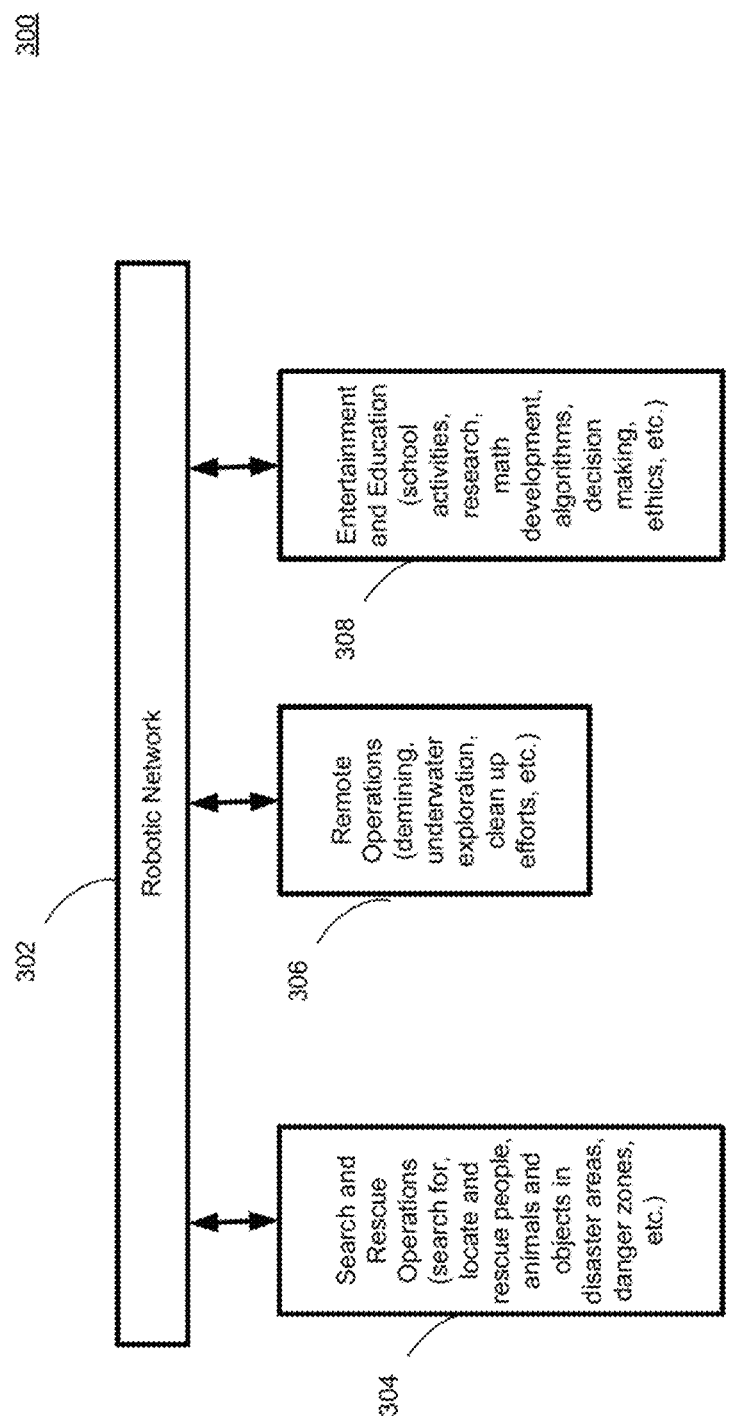
FIG. 3 describes exemplary deployable uses of robotic networks.

FIG. 3 describes exemplary deployable uses of robotic networks. In one embodiment, robotic network 302 may include one or more robots within the network. The robotic network may be implemented such that every robot within the network may be able to receive auction announcements and participate in the bidding and task allocation processes. The one or more robots within the robotic network may be configured to implement a similar task as other robots within the network, or alternatively, may be implemented to perform different tasks. In another embodiment, the robotic network may include clusters of robots, each cluster implemented to perform specialized tasks for example. Alternatively, the proposed configuration lends itself to any configuration as all deployed robots may have the same capabilities to perform any given task, however, with different quality assessment associated with each deployed robot. It is understood that the above description are merely exemplary and other non-limiting examples may also be implemented, including other configurations of robots and clusters based on certain parameters, including tasks.

Such tasks may include, for example, search and rescue operations, remote operations and entertainment and education activities. Search and rescue operations may include search operation to locate and rescue people, animals and/or objects in disaster areas or danger zone. Such rescue operations may take place indoors or outdoors. Remote operations may include demining activities, underwater exploration and cleanup efforts. For example, disaster areas may require different tasks, such as search and rescue operations and cleanup efforts that require robots fitted with multiple platforms, or different types of robots. Such types may have features that are taken into account as part of a quality assessment associated with a winning robot as will be discussed further herein.

Figure 4:
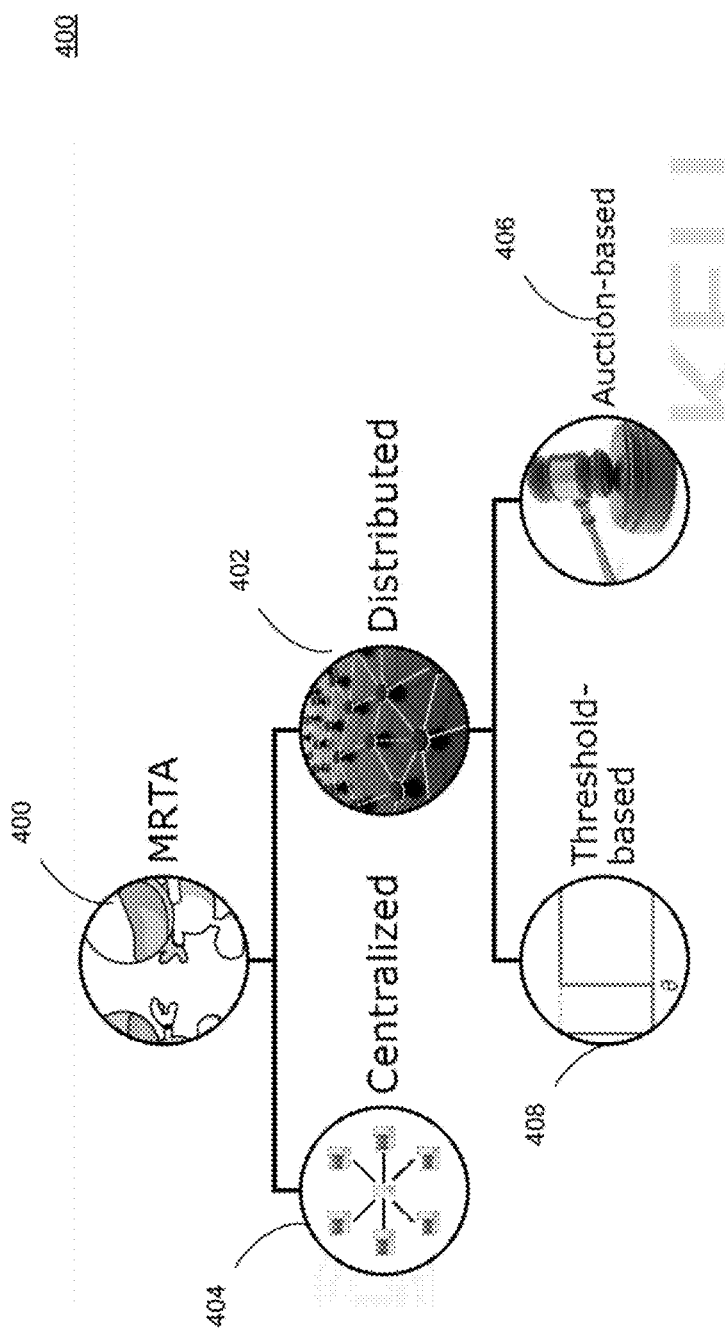
FIG. 4 is an illustration of the types of multi robot task allocation (MRTA) systems and where auction based system reside within the MRTA systems.

FIG. 4 is an illustration of the types of multi robot task allocation (MRTA) systems 400 and where auction based system reside within the MRTA system 400. For example, MRTA system 400 may include distributed systems 402 and centralized systems 404. Centralized systems may suffer from risks including single point of failure and high communication overhead (cost) that would require added processing power, battery power and overall cost of the equipment.

Distributed systems 402 may include auction based systems 406 and threshold based system 408. As described earlier, a fully distributed approach improves the robustness to failures and provides added flexibility, requiring less computations and communication resources. An auction based system further provides improvements in the optimal solution because it addresses both, local and global solutions. For example, because each robot within a robotic network works independently, instead of assigning tasks to robots and determining which is the best robot to perform the task, a robot may make such determination itself, analyze its capabilities and provide a bid to an auction. Selection of the robot is thus simplified, and multiple robots can perform tasks on local and global levels.

Accordingly, in one exemplary embodiment of the disclosure, an online distributed multi-objective task allocation approach (DYMO-Auction) is employed and assigns tasks emerging from a dynamic scenario. In one example, multiple purposes (objectives) are attempted to be satisfied, simultaneously. For example, maximizing throughput, minimizing energy consumption, minimizing traveled distance, balancing robot load, and quality satisfaction that a task is performed at a required quality. In more detail, the balancing of the load may include the balancing of the task assignments among available robots, such that a robot does not receive more tasks than another robot without justification as to why. Minimizing the total distance traveled is important for saving energy and costs associated with performing the tasks, including energy costs and time costs for example. Additionally, the less distance a robot is traveled, the less maintenance will have to be performed in the long run. Furthermore, maximizing the task execution quality ensures that a certain task is performed up to a required standard, without wasting robot resources (i.e. the wrong robot is sent to perform the task). In other words, a high quality robot can perform the entire task (best quality) but this may waste robot resources on low quality tasks. For example, a high quality robot may be better utilized performing a high quality task (high definition picture) rather than be used to perform a low quality task (low definition picture when a low quality robot may be available.

The task assignment process takes into consideration distance, workload balance of the robot and a quality assessment including a task quality and robot quality requirement as further described herein. The auctioneer can be anyone but only one robot from the team of robots. A team of robots may be a collection of similarly equipped robots, or robots equipped differently as to cover a wide spectrum of quality tasks that can be performed more efficiently. In one example, a team of robots may have robots with different physical capabilities. In another example, a team of robots may include robots that are all configured to perform a minimum level of tasks. Determination is then made as to which robot is best suited to perform a task based on the task quality requirement and the robot quality feature. In this regard, robotic resources are not wasted on a task that has lower quality requirements. Additionally, resources are not wasted also because task with high quality requirements are not performed by low quality robots that will lead to quality dissatisfaction or performing the task again with a different robot.

Herein below, a further discussion of embodiments of the present disclosure is presented.

Figure 5B:
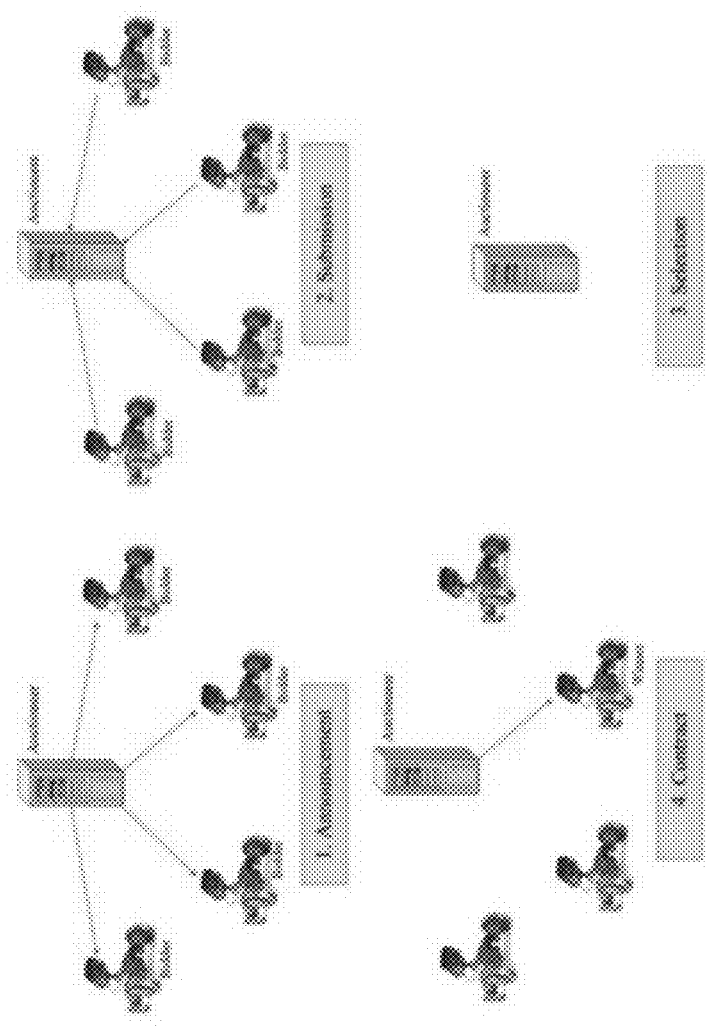
FIG. 5B illustrates communication methodology between a bidder robot and an auctioneer to facilitate task allocation within MRTA systems according to an exemplary embodiment.
Figure 5A:
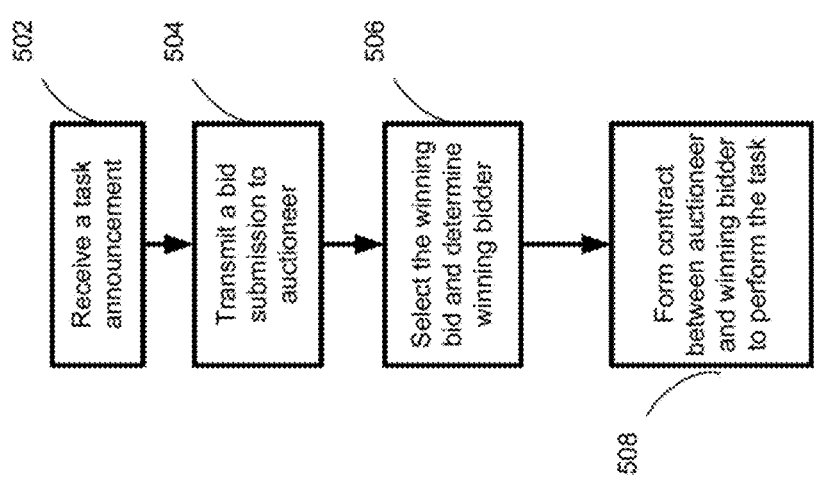
FIG. 5A illustrates a method for task allocation within MRTA systems according to an exemplary embodiment.

FIGS. 5A and 5B illustrate task allocation methodology.

FIG. 5A illustrates a method for task allocation within MRTA systems according to an exemplary embodiment. In one example, the method may include receiving a task announcement 502 from an external source, transmitting a bid submission 504 to an auctioneer, selecting a winning bid and determining a winning bidder 506 and forming a contract between auctioneer and the winning bidder to perform the task.

A task announcement may be received from a variety of external devices, including a network server, a mobile device, a central announcement processing device and the like. In one example, a mobile device network may be connected with a network server configured to processes task requests associated with tasks located near a mobile device transmitting a request, within the mobile device network. Thereafter, the network server may send out a task announcement to one or more robotic networks to solicit bids. Once an auctioneer is selected or designated, the auctioneer may send out an announcement for solicitation of bids from robots within a robotic network. The announcement may include a task, a level of effort associated with the task, location of the task to be performed, and a time frame for completion of the task. The announcement may also include a task quality metric associated with the task. For example, a task may be taking a picture, and a task quality maybe a quality of the picture that needs to be taken.

After receiving the announcement robots in the robotics network may submit a bid 504 to the auctioneer. The bids include information relating to the bidding robot's statistics, availability, physical pre-configuration, charge and the like. A bid may also include a robot quality metric, which relates to a quality of a physical pre-configuration of the robot. For example, a robot may be equipped with a camera to capture images and video streams. However, the camera may be a low resolution camera or a high resolution camera, may include video capturing capabilities, and may include video recording capability and the like. In one example, depending on the quality metric, two or more robots that submit bids for a task (e.g. taking a photo) may be distinguished by the quality metric associated with each robot.

In one embodiment, a robot quality metric may be based solely on the physical pre-configuration of the robot. For example, if a robot has a 4 megapixel camera, it may receive a quality metric of a certain value. If the robot has an 8 megapixel camera, however, it may receive a quality metric of a higher value. Alternatively, the robot quality metric may be assigned based on a task. For example, if the metric is based solely on the physical pre-configuration, a robot that has a camera with only video capturing capabilities may receive a lower quality metric than a robot with a high resolution picture taking camera. However, a task based quality metric assignment, for example, video with a video capturing capability may be assigned a higher quality value as its capabilities appear to be more relevant for a task involving a video recording feature. The quality parameter may incorporate the robot quality parameter as well as the task quality parameter. In one example, the total quality parameter may be the difference in value between the robot's quality parameter and the required quality by the task. Accordingly, the fitness is inversely proportional with the quality parameter.

Based on a variety of metrics, as described further herein, an auctioneer may select 506 a winning robot and a contract may be formed 508 between the auctioneer and the winning robot to perform the task.

FIG. 5B illustrates communication methodology between a bidder robot and an auctioneer to facilitate task allocation within MRTA systems according to an exemplary embodiment. As described in FIG. 5A, an auctioneer may receive a task announcement from an external device, such as a web server or a mobile device soliciting a task to be performed. Alternatively, the auctioneer may be an originating device itself, originating tasks determined to be required. For example, the auctioneer may be a robot in the field that determines a task is needed (e.g. a cleanup operation or a rescue mission) and is not currently equipped to handle the observed task. Accordingly, the robot may designate itself as an auctioneer and issue an announcement for a task to be performed (i.e. a cleanup task requiring a robot with a certain physical pre-configuration).

The auctioneer may then send a task announcement inviting other robots in the robotic network to submit bids to perform the task and the auctioneer may then select a winning robot based on the robot's submission.

In the robotic selection process, a common factor used in task allocation process is a traveled distance of a bidding robot; hence it can be formulated as traveling sales man problem and solved based considering distance only. Distance alone is not a sufficient metric in determining the capability of performing a task in a timely and comprehensive manner. As such, other factors may also be part of the consideration. For example, one such factor includes resource consumptions besides the traveled distance, such as a distributed resource-oriented auction algorithm that considers the resources that a robot consumes while it executes the task. This may contribute the awarding of the winning robot because the winning robot may run out of resources while executing the task and as such, render the task incomplete. Additionally, mobile sensors are responsible for locating and identifying the tasks, whereas robots are responsible for performing the tasks. When a sensor identifies a task, it sends a request to the robots; the closest robot will be the coordinator for that task and will forward the request with a time limit to other robots. Each robot that has a vacancy will participate, computing its utility based on (Cost, energy, distance, type of task) and sending a reply. Then, the coordinator will assign the task to the robot with the highest utility. Another metric used in a bidding model to select an appropriate robot in discovering an unknown area, for example, includes a nearness measure (as a communication link measure) in the utility function, which computes the distance between the current robot and its neighbors. The use of the nearness measure keeps robots close to each other and reduces the total travel distance and total discovery time.

An auction-based approach is used to assign robots to a task cluster. However, for task clustering, each robot must compute its cost for executing all combinations of tasks, which is a complex process, particularly if there are a large number of tasks.

As such, the main concept is that the winner obtains the task with a contract to finish it within a time window. The Auctioneer is responsible for monitoring the progress of the task; if it discovers a failure or insufficient progress, it can terminate the contract and announce this task in a new auction process. A coordinator may be responsible for arranging the auction and distributing task information. Robots are heterogeneous, and for each task, some are eligible to participate in the auction based on the task requirements.

Accordingly, in one exemplary embodiment, a methodology that can be applied to dynamic scenarios where tasks are initially not available, but rather, emerge over time, based on needs, observations and the like, is implemented. Additionally, while travel distance or load balancing are factors under consideration in determining the formulation of bids, the embodiment further includes a task allocation process wherein task and robot quality may also be a requirement along with travel distance and workload as further described herein. Another characteristic of an exemplary embodiment of the present disclosure considers a task allocation method in which the DYMO-auction is used online (i.e. tasks are assigned whenever they emerge, in real time) without the need for any prior information. This is an improvement in the technology as it reduces the need for clustering and advanced calculation of tasks and distribution of non-updated tasks because every calculation is based on real time analysis and assessment of existing task and tracking of their performance and completion.

Additionally, in considering a quality metric for a task and for the robot performing the task, tasks may be performed more efficiently, more thoroughly and with greater degree of satisfaction.

Figure 6:
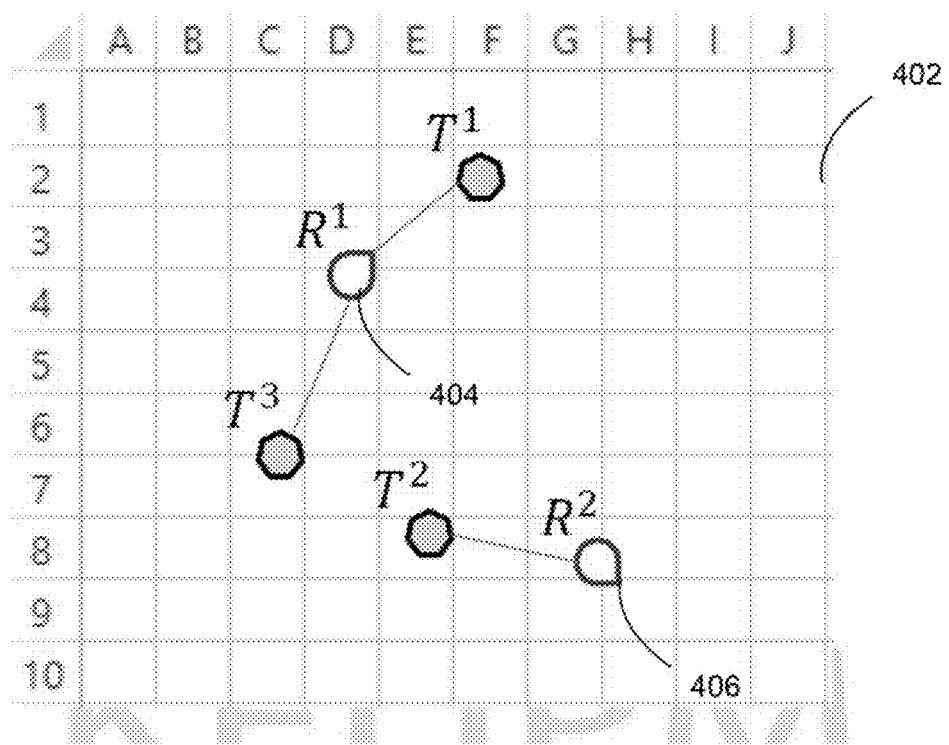
FIG. 6 illustrates a robotic network with robots being deployed randomly in an area in which dynamic tasks are received and robots are assigned tasks based on auction task allocation according to an exemplary embodiment.

FIG. 6 illustrates a robotic network with robots being deployed randomly in an area in which dynamic tasks are received and robots are assigned tasks based on auction task allocation according to an exemplary embodiment. As an initial matter, all robots in a robotic network may be deployed in an area of interest, either randomly, or for a purpose. For example, robots 404 and 406 may be deployed at random locations within area 402. As the tasks are generated in real time, a task may appear, such as anyone of tasks T1-T3 within area 402. A task may be discovered either by mobile sensors or by a static wireless static network (WSN). The auctioneer opens an auction for the discovered task, and robots bid on that task. Then, the auctioneer will assign the task to the robot with the minimum cost. A robot $R_i$ bids on a task $T_j$ using bidding rules that are designed to minimize the total traveled distance, maximize the quality satisfaction, and distribute the workload among the available robots. The winner robot starts visiting and executing the assigned tasks $A_i$, and it can also participate in the upcoming auction processes. It is noted that a robot's future cost associated with a winning task to be performed (i.e. already scheduled task) may affect the determination/scoring of the robot's assessment in a future bid.

For example, if a robot is currently performing a task, and is deemed to be close in distance to a future task currently being advertised, a self-assessment score will take into consideration the robot's future location and requirement for performing the task. For example, if the chronology of tasks is not important, then the robot will use its current location in performing the self-assessment score modify the scheduled tasks to accommodate a potential superseding task. Alternatively, if a robot is due to perform a time sensitive task, next, at a future location, then that future location is used in the self-assessment for the new task bid and not the robot's current location. In this manner, the most efficient assignment may be given to the robot that can perform the task in a most efficient manner. It is also noted that other factors will also play a role as discussed herein, including, for example, quality considerations as well as the current load of the robot.

The following are exemplary parameters in consideration of a system and system characteristics. It is understood that other parameters may also be considered and that the foregoing parameters are used for illustrative purposes. The following are exemplary conditions of a test in accordance with an embodiment. The conditions include The robots are randomly deployed in the area of interest A.

The tasks appear uniformly within the area of interest A.

The number of robots m is less than the number of tasks n, i.e. (m<n).

The order of the tasks' execution is not important; thus, a robot is free to perform assigned tasks based on the travel distance, not their assignment order.

A robot $R_i$ has an exponential distribution service time with a rate of µ (tasks/hour)

A task $T_j$ demands a quality level $q_j$ for its performance. The task quality level is uniformly distributed over the entire range, from the minimum to the maximum quality level. The range of the quality level is defined by the application itself (e.g., three quality levels would be low, medium and high).

Task discovery may be performed either by a separate system, such as mobile sensors/a WSN, or by the robots themselves; in both cases, we assume that only one robot receives the details of a given task. A robot may select to receive the details of a given task at random, or may be selected based on other criteria. An auctioneer robot may be any robot within a range of an advertised task. Additionally or alternatively, an auctioneer may be a robot that is deemed to have a maximum number of neighboring robots, such that the auctioneer will be the most suitable robot that is capable of disseminating the task information to the greatest number of robots. Accordingly, in one example a robot network including equipment may keep track of robots, robot locations, clustering, and the like such that each robot knows of and advertises the number of determined neighboring robots within a predetermined range from the robot. Accordingly, if a task is originated at location x, then an auctioneer may be deemed to be the robot closest to location x, or a robot that is within a predetermined distance range from location x and deemed to have the greatest number of neighboring robots.

In one example, a scenario of imaging objects (plants) for a disease diagnostic system may be used to further illustrate the task allocation methodology. A team of robots equipped with appropriate sensors integrated with a remote sensing system, such as that illustrated in FIG. 6, can be used in a useful farming scenario application. This application includes two systems: remote sensing and near-range sensing. The aim of remote sensing is to detect and diagnose any unhealthy symptoms in an area of interest, such as diseases, weeds, and pests. If any disease is detected, the remote sensing advertises a new task for the near-range sensing system, which is a team of robots equipped with appropriate sensors, such as a camera, thermography, chlorophyll fluorescence and hyperspectral sensors. The remote sensing system provides necessary information about a task, such as its location, the amount of resources required (fertilizers/pesticides), and the required quality. A robot's quality is the quality of its camera resolution, whereas a task's quality requirement is the resolution of the image required (since different diseases require different image resolutions to be detected).

A cleaning process is another example in which there are different spots; some are easy to clean (low quality), whereas others are difficult (high quality). A team of robots is equipped with different tools/materials based on their cleaning capabilities.

Quality is a term used to represent the preference that a robot and task that have the same quality level be paired. In other words, a task with quality level $q_j$ may be executed by a robot with quality level $q_i$ such that $q_i$ is equal or close to $q_j$. It is also possible for a task to be executed by a robot with a different quality level, either higher or lower. In the first case, where a robot's quality level is higher than a task's quality level ($q_i > q_j$), some resources will be wasted from the robot's perspective (e.g., image storage size, energy consumed by a high-quality camera, transmission bandwidth required for a high-quality image), whereas from the task's perspective, its requirements have been satisfied (the image is captured with a resolution greater than what is required). For the other case, when a low-quality robot executes a higher-quality task ($q_j > q_i$), there is no waste in resources, but the task's requirements are not completely satisfied (the image has a resolution lower than what is required). To differentiate between a task type and task quality level, we can state that there are different quality levels for the same task type.

The robots use the proposed approach to assign each farming task to a robot in a balanced manner considering the travel distance to the task location and satisfaction of the image quality required (the quality level).

Quality Settings

Figure 7:
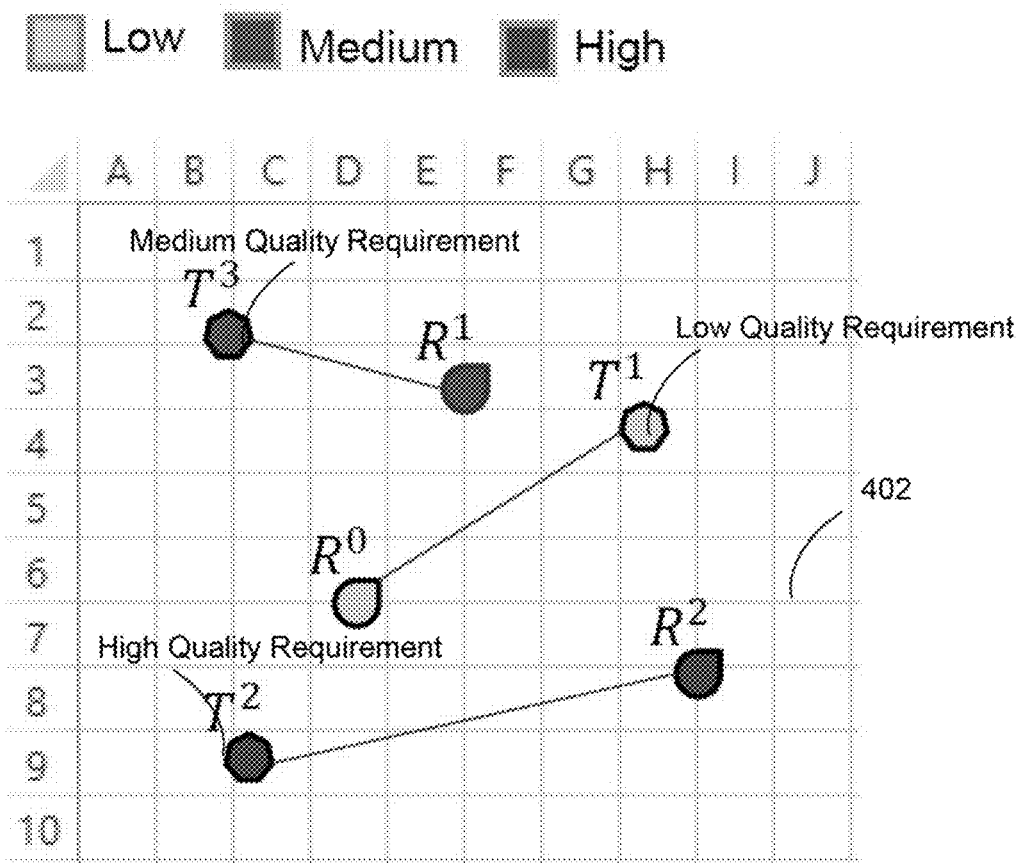
FIG. 7 illustrates decision making considerations based on a quality factor including quality considerations associated with the task and quality considerations associated with a winning robot.

FIG. 7 illustrates decision making considerations based on a quality factor including quality considerations associated with the task and quality considerations associated with a winning robot. For example, Robots R0, R1, and R2 may be selected to perform tasks T1, T2 and T3 based on different locations within distributed system 402 and based on quality conditions associated with each robot. For example, R1 may be selected to perform task T3 even though R1 is closer to T1 because R1 has a better quality match to perform in task T3. Similarly, R0 may be selected to perform task T1 even though R0 is closer to T2. Accordingly, this illustrates that based solely on quality considerations, different robots may perform tasks that are not always closest to the robots. Accordingly, a weighting factor may be implemented as described herein, which takes into account, not only the traveled distance of the robot, but also the quality measure associated with the robot and the task. This is to ensure that a task can be accomplished according to the request in the most complete and efficient way.

In one embodiment, the task's quality requirements levels may be defined by $Q_T = a_1, a_2, a_3, a_k$, from the very low quality level a to the very high ak, based on the application. Generally speaking, the robots' quality levels must cover all the tasks' quality such that some robots have high quality and others medium and low quality. Assuming the robots' quality levels is given by $Q_R = q_1, q_2, q_3, \ldots, q_z$, then the following equation to scatter the robots' quality levels over the tasks' quality levels:

$$q_i = (i-1) * \beta + \alpha$$

β is the range of task qualities covered by each robot's quality level, α is used to compute $q_i$, and they are computed as follows:

$$\beta = \frac{k}{z}$$

$$\alpha = \frac{\beta + \alpha_1}{2}$$

where k and z are the number of task quality requirement levels and the number of robot quality levels, respectively. In one example, 9 levels of quality requirements for the tasks (k=9), represented by numbers from $a_1$ (very low quality) to $a_9$ (very high quality) may be implemented. Accordingly, the robot qualities may be computed to be $Q_R=2, 5, 9$, whereas β=9/3=3 and α=(3+1)/2=2.

Objectives

There are three primary objectives to be achieved in the auction based approach. They are:

1. Minimize the sum of traveled distance (TTD) per robot.

$$\min_{\forall i \in \{1,2,3,\ldots,m\}} TTD(R_i, l_i)$$

2. Maximize quality satisfaction (minimize the sum of differences between robot quality and assigned task quality).

$$\min_{\forall i \in \{1,2,3,\ldots,m\}} \left( l_i * q_i - \sum_{j=1}^{n} q_j \right)$$

where $l_i$ is the number of tasks assigned to a robot $R_i$.

3. Balance the load between all robots.

$$\min_{\forall i \text{ and } j \in \{1,2,3,\ldots,m\}} |l_i - l_j|, i \neq j$$

Bidding Rules

Bidding rules are rules for robots to follow for allocating the task, and they reflect the objectives of the DYMO approach. Assume that a robot $R_i$ with quality level $q_i$ is located at position $p_i$, and that a task $T_j$ requiring quality level $q_1$ is located at position $p_j$. The robot $R_i$ bids on a task $T_j$ using the following three bidding rules, which are derived from the aforementioned objectives.

Bid Based on Distance

A robot $R_i$ located at position $p_i$ bids on a task $T_j$ located at position $p_j$ by the minimum distance between either its location $p_i$ or the position $p_k$ of any unaccomplished task to which it has already been assigned.

$$d_{ij}=\min(|p_i-p_j|,\min(p_k-p_j))\forall T_j, R^i$$

This rule will guarantee that the synergy between tasks is considered to minimize the traveled distance. Synergy is a term used to describe the relationship between tasks; tasks have a positive synergy if the total cost of executing both of them by one robot is less than if each is executed by a different robot. Spatial synergy is considered in this work from which synergy can be defined based on distance as follows: if the total traveled distance for visiting two tasks using one robot is less than the total traveled distance if each task is visited by different robots, then these tasks have positive synergy, and vice versa.

Figure 8:
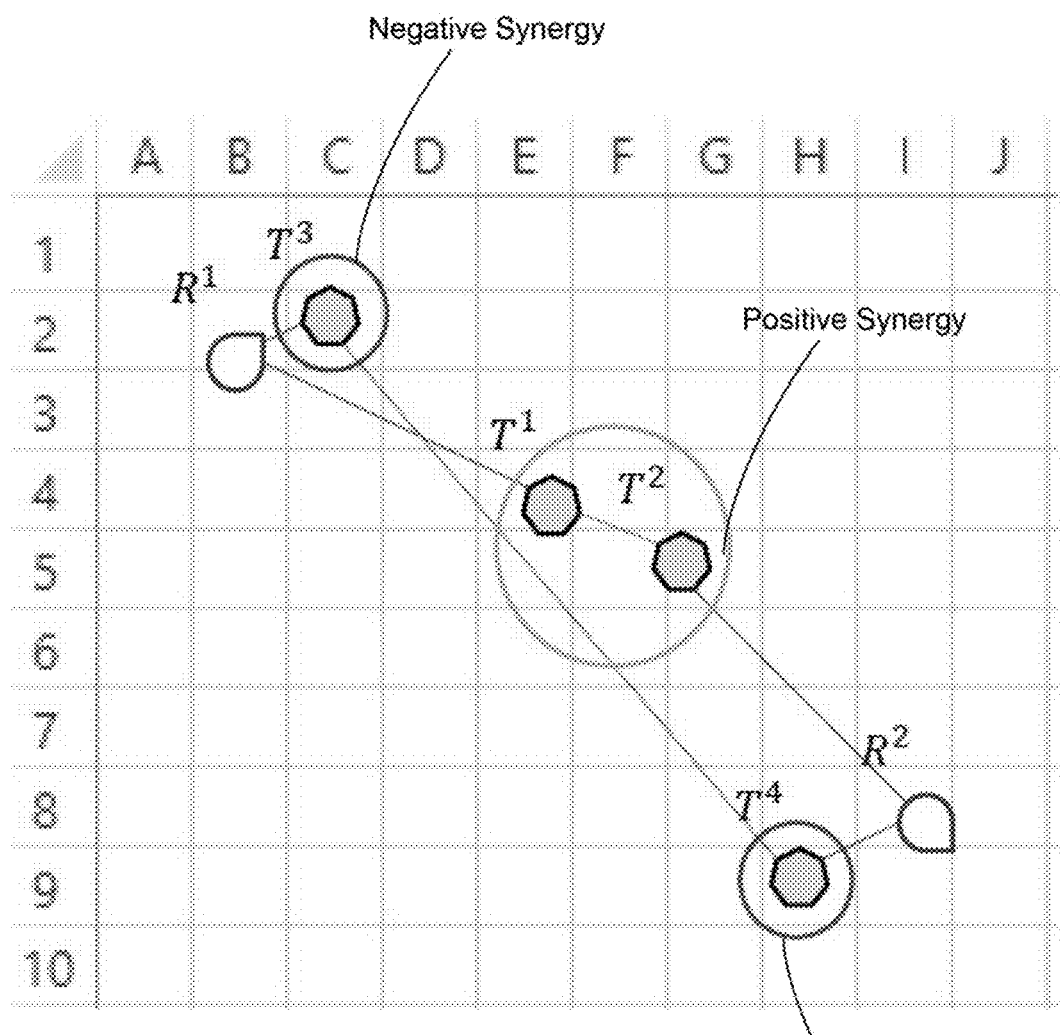
FIG. 8 illustrates decision making considerations based on task synergy displaying positive task synergy and negative task synergy according to an exemplary embodiment.

FIG. 8 illustrates decision making considerations based on task synergy displaying positive task synergy and negative task synergy according to an exemplary embodiment. Here, for example, two tasks ($T_1$ and $T_2$) performed by a single robot ($R_1$ or $R_2$) produces positive synergy according to the following formula:

$$D(R^i \to T^a + T^b) < D(R^i \to T^a)(R^j \to T^b)$$

While two tasks ($T_3$ and $T_4$) performed by two separate robots ($R_1$ or $R_2$) produces negative synergy according to the following formula:

$$D(R^i \to T^a + T^b) > D(R^i \to T^a)(R^j \to T^b)$$

The proposed DYMO-Auction algorithm considers tasks' spatial synergy. This ensures that if a robot wins a task $T_a$, then it is more likely to win other tasks that have positive synergy with $T_a$. Therefore, A robot $R_i$ located at position $p_i$ bids on a task $T_j$ located at position $p_j$ by the minimum distance between itself and the target location $p_j$, or the minimum between the target location $p_j$ and any of robot's assigned tasks' location $p_k$. For example, in FIG. 7 if the task $T_1$ is assigned to the robot $R_2$, then the robot $R_2$ bids on the next task $T_2$ by the distance between $T_1$ and $T_2$. Hence, the traveled distance cost that a robot will bid based on is given by:

$$d_{ij}=\text{MIN}_{(|p_i-p_j|,|p_k-p_j|)} \forall T_k \text{ in } l_i'$$

Bid Based on Quality Satisfaction

A robot bids with the difference between its quality level $q_i$ and a task's quality level $q_j$.

$$q_{ij}=|q_i-q_j|$$

This metric will ensure that a robot with a quality level equal or close to the task's quality level will win the task. This approach will maximize the quality satisfaction objective.

Bid Based on Workload

Let $l_i$ the number of current number tasks that have been assigned to a robot $R_1$. Then, the robot will bid with the current number of assigned tasks $l_i$, e.g. if robots $R_1$, $R_2$ and $R_3$ have assigned task lists $l_1=3$, $l_2=3$ and $l_3=2$ respectively, then robot $R_3$ will win the new task because it has the minimum bid ($l_3=2$). This rule ensures that the robot that has been assigned a minimum number of tasks will have an opportunity to win the new task.

Auction Process

The auction process is the main component of the market-based task allocation approach; robots cooperate with each other via an explicit negotiation. In one embodiment, the method deploys a low-cost one-round single auction, meaning that a task is assigned to the robot with the lowest bid in one round. Robots bid by their cost to execute the task. The auction process consists of four sequential steps.

---

Algorithm 1: Auctioneer algorithm input: New task announcement
output: Assigning a task to the highest bidder
1      AuctioneerBid ← ComputeMyBid( );
2      AppendToBidsList (AuctioneerId, AuctioneerBid);
3      BroadcastAuctionMsg( );
4      AuctioneerTimer ← t sec;
5      while !IsAuctionEnds( ) do
6      | if ReceiveBidMsg( ) then
7      | | AppendToBidsList (bidValue, Bidder ID);
8      winnerBidder ← GetHighestBidder( );
9      SendTaskAssignMsg (winnerBidder);

---

Algorithm 2: Bidder algorithm input: Auction message, Task assignment message
output: Bid for task, append assigned task to the task list
1      In parallel with other procedures;
2      if AuctionMsgReceived( ) then
3      | MyBid ← ComputeMyBid( );
4      | sendBidMsg (MyBid, auctioneerID);
5      else if TaskAssignMsgReceived( ) then
6      | AppendToTaskList (New Task);

---

1. Task advertisement: The auction process starts once a robot discovers a new task or receives a new task advertisement message from an agent outside the system, such as a remote-sensing system in automated farming applications. In one example, the farming equipment may include additional sensors such as a GPS sensor, a transceiver, and biological sensors such as bio hazard detection sensors and the like that may be connected to a computing device associated with the farm equipment or a separate processor. Upon detection of a hazard, the processor may trigger a trigger event in which a task may be generated and allocated. The task may be generated at the farm equipment (e.g., farm equipment detects a hazard and sends out task information to an auctioneer robot). Alternatively, the task may be generated at a centralized location (e.g., task creating processor that receives trigger events and transmits task information to different auctioneers based on centralized information).

The task advertisement message includes all details of the task: its location, its quality level, and the required resources to execute it. The robot that receives the task's details will consider itself the auctioneer for that particular task 2. Auction announcement: Then, the auctioneer computes its bid for the task and announces a new auction by broadcasting an auction message auctionMsg to its neighbors. The auction announcement message contains all the details of the current tasks. The auction remains open for a sufficient amount of time to allow bidders to send their bids.

3. Bid submission: Once a robot receives an auction announcement message, it computes its bid based on the proposed cost function and submits it to the auctioneer. The proposed approach considers the distance, quality satisfaction and workload balance. A bid is a scalar value computed using the cost function and represents a robot's cost to execute the task.

4. Closing the auction and winner selection: During the auction, the auctioneer maintains a list, BidsList, of all current bids and the associated bidders' IDs; then, once the auction time ends, it selects the bidder with the minimum bid (cost) from the bids list BidsList and assigns it the current task.

Figure 9:
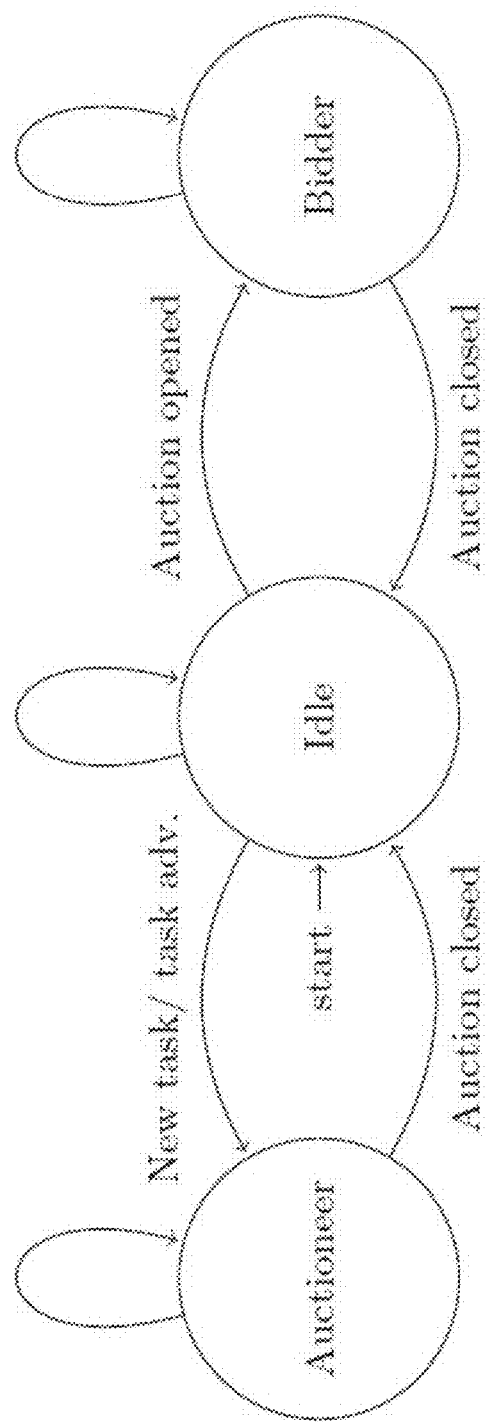
FIG. 9 illustrates a robot state diagram during an auction process according to an exemplary embodiment.

FIG. 9 illustrates a robot state diagram during an auction process. A robot initially starts in the idle state, and if it receives a task advertisement, it jumps to the auctioneer state in which it computes its bid and opens a new auction for the task, as shown in algorithm 1. All robots that receive the auctionMsg may change from the idle state to the bidder state and run algorithm 2, in which they compute their cost and send it to the auctioneer. The auctioneer then selects the winning bidder and sends it the task assignment message winMsg. While an auctioneer selects a bidder from bid submissions from other robots, the auctioneer robot may perform its own calculation and submit its own bid, which may also be taken under consideration. This is in a case where the auctioneer robot is the best suited robot to perform the task. After the task has been assigned, all robots, both the auctioneer and bidders, return to the idle state again. After that, robots that have tasks to be performed will then return to performing their respective tasks.

Cost Function

Because of the three bidding rules, each of which considers an objective to satisfy, there is a need to combine these bids into a single bid to be sent to the auctioneer. For this purpose, the values are normalized and used the weighted sum model to compute the final bid. For example, each value is normalized to its maximum expected value as follows. The maximum distance between any two points in the area is D (diagonal of the area), the maximum deviation between a robot quality level and task quality level is $\Delta Q$, and the maximum expected tasks for each robot is L; then, we normalized the objective as follows:

$$\overline{d_{ij}} = \frac{d_{ij}}{D}$$

$$\overline{q_{ij}} = \frac{q_{ij}}{\Delta Q}$$

$$\overline{l_i} = \frac{l_i}{L}$$

Therefore, the cost value for a robot $R_i$ to execute a task $T_j$ is given by the following equation:

$$C_{ij} = W_d * \overline{d_{ij}} + W_q * \overline{q_{ij}} + W_t * \overline{l_i}$$

where $W_d$, $W_q$, and $W_t$ are weights that sum up to one. The cost is proportional to the distance, the difference between task quality requirement and robot quality, and the load, and therefore, all three terms have a positive sign.

Costs computed based on the distance factor alone lead to insufficient quality satisfaction because there is no relation between the task quality and being close or far from robots. Hence, distance and quality factors are independent factors. A test has been conducted to determine the appropriate weights of the distance and quality factors, i.e., $W_d$ and $W_q$, respectively ($W_d|W_q=1$) given that the robots' quality levels are three (low, medium, high).

Figure 10:
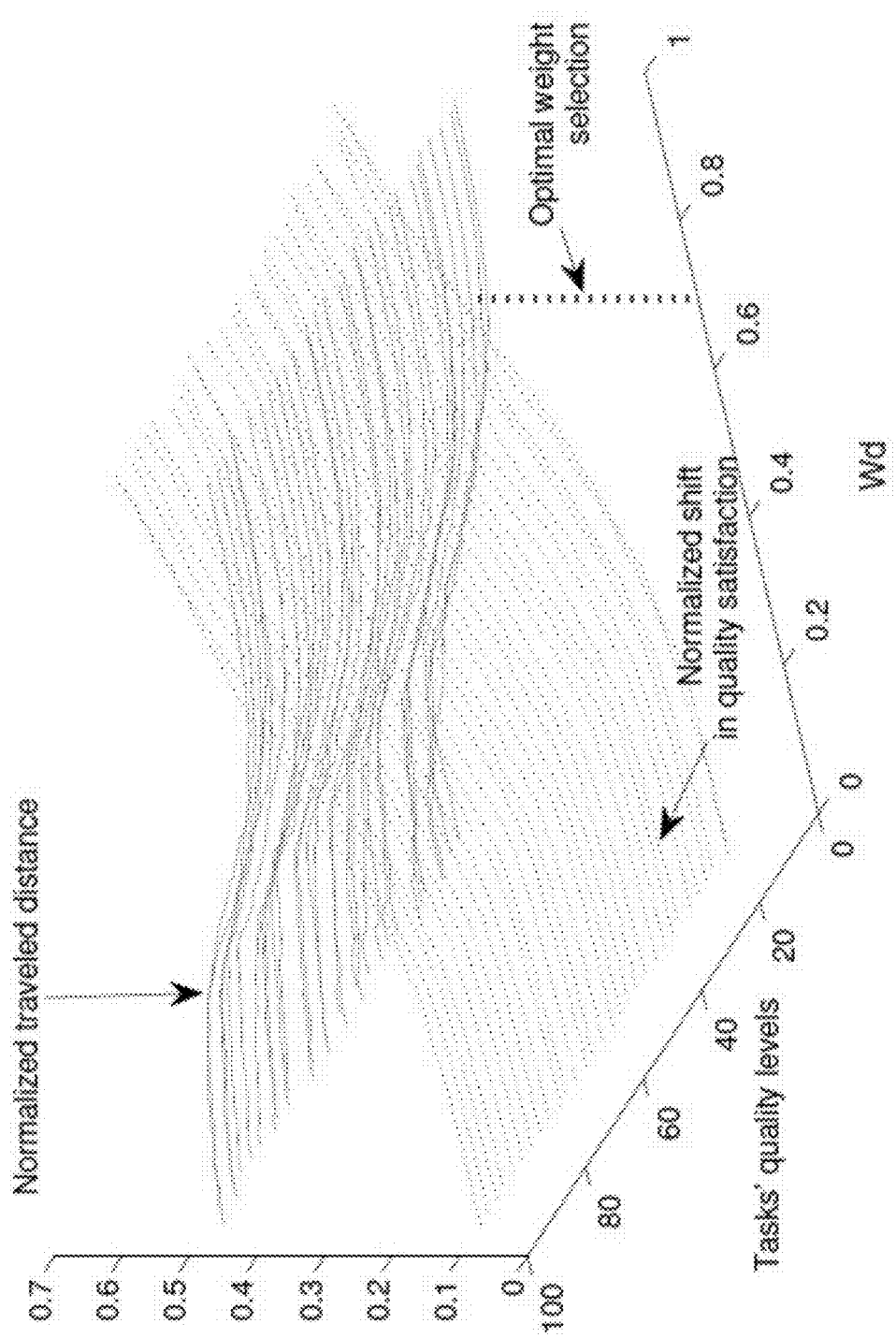
FIG. 10 shows the relation between the traveled distance and quality satisfaction with respect to changes in weighted distance $W_d$ according to an exemplary embodiment.

FIG. 10 shows the relation between the traveled distance and quality satisfaction with respect to changes in $W_d$. The best quality satisfaction occurs when $W_q=1$ (i.e., $W_d=0$); however, this is the worst case for travel distance. As expected, the travel distance decreases with increasing $W_d$; whereas the shift from quality satisfaction increases. The point at which the two objectives intersect (i.e., $W_d=0.7$ and $W_q=0.3$) will be the optimal setting for both. These weights are used in the cost function.

Figure 11:
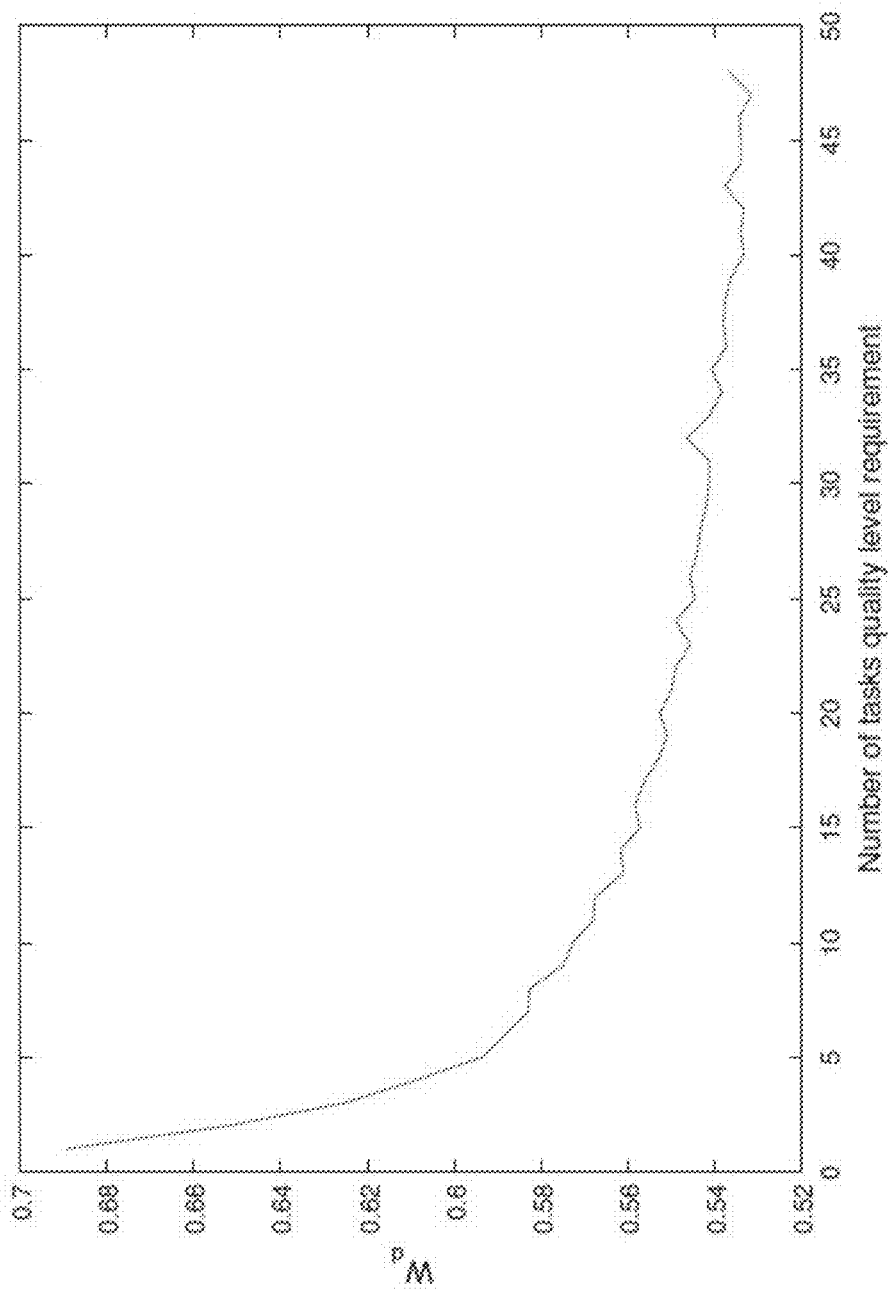
FIG. 11 illustrates changes in optimal weights with respect to the available number of robots' quality level according to an exemplary embodiment.

FIG. 11 shows that the optimal weights change with respect to the available number of robots' quality level and the effect of increasing the number of robots' quality levels on the weight $W_d$. As the number of robots' quality level increases, the weights of distance gets close to 0.5; which can be understood if the normalized value of a difference in distance between a robot and a task is almost the same as the difference in quality level, as there are a large number of quality levels for robots' and tasks'.

Although considering task synergy reduces the total traveled distance, it may result in a robot winning all of the available bids without accounting for a workload balance. Accordingly, a workload balance factor is also implemented in the decision making process.

Figure 12:
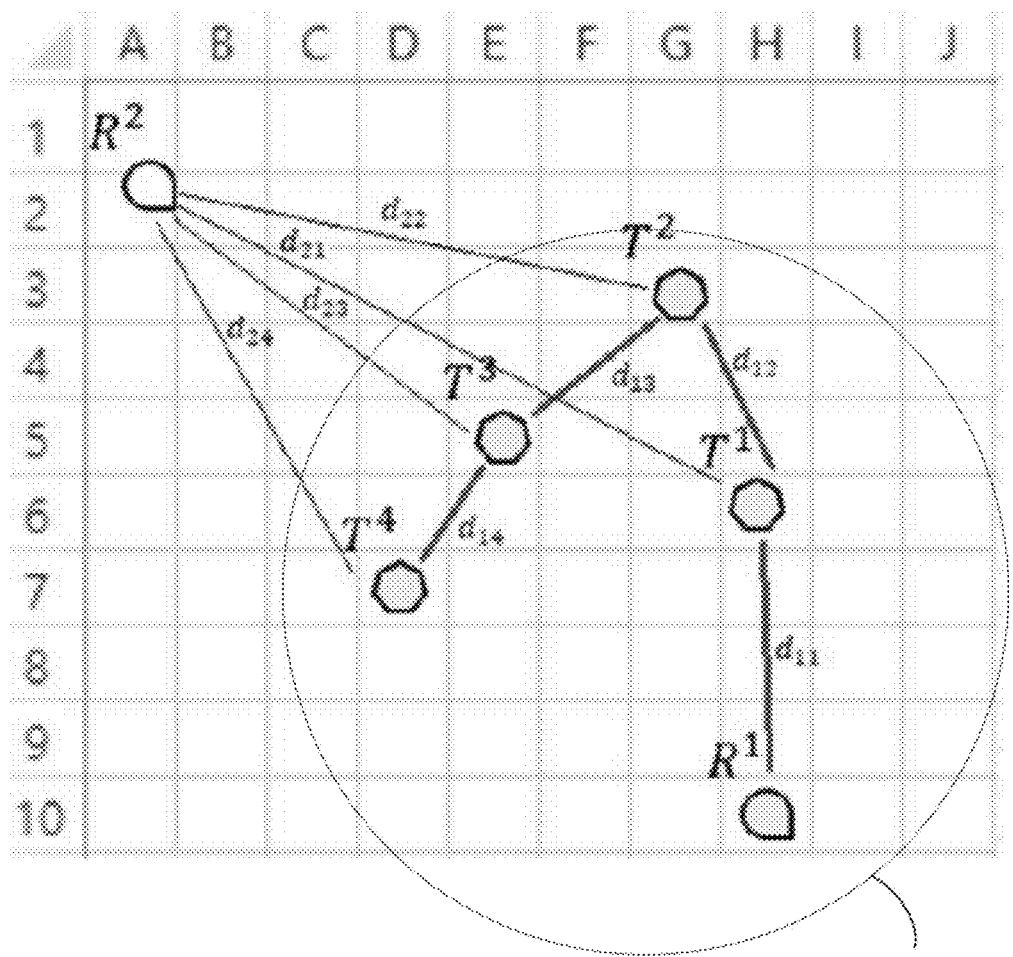
FIG. 12 illustrates a synergy effect of task occupation according to an exemplary embodiment.
Figure 13:
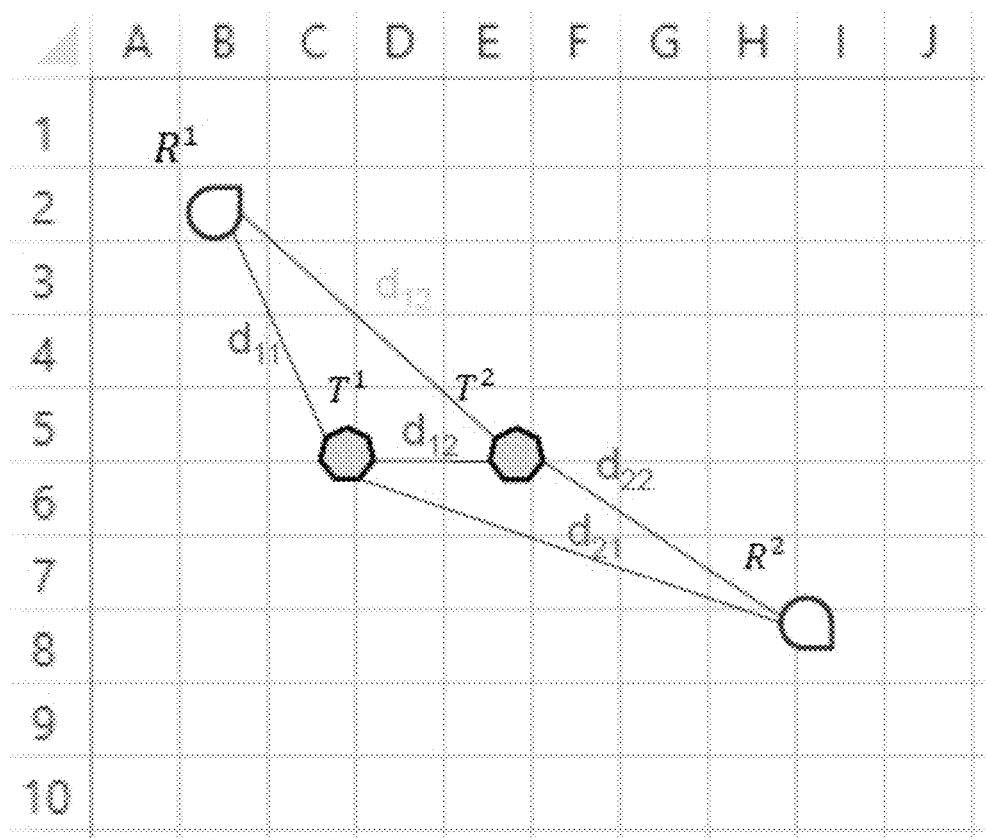
FIG. 13 illustrates a distance minimization using synergy effect according to an exemplary embodiment.

For example, in FIG. 12, robot $R_1$ won all of the tasks, whereas robot $R_2$ won nothing (i.e., using $(d_{1x} < d_{2x} \forall x=1, 2, 3, 4)$. This effect on the bidding process may be referred to as jump to the middle problem (JMP). The JMP occurs because once the robot $R_1$ wins a task located close to the middle of the area of interest, it becomes close to more new incoming tasks. Because of the synergy definition, it consequently wins an increasing number of tasks, leading to a compromised load-balancing objective. Therefore, we had to re-design the cost function to include the workload balance objective, and we recomputed the weights associated with each objective.

$$C_{ij} = 0.47 * \overline{d_{ij}} + 0.23 * \overline{q_{ij}} + 0.3 * \overline{l_i}$$

In one example, the weights may be set equally to ⅓, i.e., $W_d = W_q = Wt = ⅓$. In a different example, the weight of $W_t$ is kept at ⅓ and the remaining two thirds are divided between $W_d$, $W_q$ proportionally based on the results from the normalized traveled distance assessment illustrated in FIG. 10 such that $W_d = 0.72/3 = 0.47$, $W_q = 0.32/3 = 0.23$. Hence, the final weighted sum cost function that will be used is illustrated above.

In one embodiment, the order of the task execution may not be emphasized. As such, a robot may visit the assigned tasks using the minimum route, which is a variation of the traveling salesman problem (TSP). One algorithm that may be used is the nearest neighbor (NN) algorithm, which comes with low computational requirement, in which a robot orders its tasks in descending order based on their distance from its current location and then executes them one after another. Time constraints may be placed as additional metrics. For example, if the activity is a rescue mission, time might be of the essence, and thus, a particular activity might be prioritized over another based on expediency, rather than distance. Accordingly, time constraints may be used as additional factors. Alternatively, time constraints may be considered as part of the quality metric, and robots may perform the tasks with that consideration in effect, as described in FIG. 7.

Performance Evaluation

To measure the performance of the proposed DYMO-Auction approach, different scenarios were devised to test this approach. The following performance metrics have been used for evaluation:

1. Sum of the total traveled distance (TTD), which is the sum of the distance traveled by a robot to accomplish all of its assigned tasks. The distance traveled by a robot $R_i$ that is assigned k number of tasks is computed as follows:

$$TTD = \sum_{i=1}^{n} \sum_{j=1}^{k} d_{ij}$$

where $d_{ij}$ is the distance between the robot $R_i$'s location and the nearest task $T_j$.

2. Quality satisfaction, which measures the quality satisfaction of the tasks. If the tasks have been assigned to robots with similar qualities, the average quality level for all assigned tasks for each individual robot will be nearly equal to the robot's quality level, and it is computed as follows:

$$R_q^i = \frac{\sum_{j=1}^{l} q_j}{l}$$

where l is the number of tasks assigned to robot $R_i$, and $q_j$ is a task quality requirement.

3. Load balance, which indicates whether the total load (the number of tasks) has been divided equally among the available robots or not. The optimal load balancing is when all robots execute the same number of tasks.

$$R_L^i = \left\lceil \frac{n}{m} \right\rceil$$

where n is number of tasks and m is the number of robots.

Simulation Setup

This approach was validated by evaluating its performance using Kheperalll robots on the Webots simulator. The Kheperalll robot was used because it is well known and commonly used in such experiments.

The controllers of the robots are written in the C programming language, DYMO-Auction, as well as a proportional-integral-derivative (PID) controller, which controls the robot navigation. The PID controller is a feedback control system that continuously calculates the difference between the desired goal and measured current state. A robot uses the MD controller to navigate to a task's location (desired goal), always computing the error (the difference between the current robot location and task location) and minimizing it. The PID controller uses odometry to estimate the current robot location and utilizes the IR sensor ring to avoid obstacles while driving a robot towards a task's location.

In one embodiment, three Kheperalll robots are deployed and are assigned quality levels represented by numbers (2, 5, 8) as low, medium, and high quality respectively. Tasks emerge with wide range of quality level requirements; we represent these levels from very low to very high quality level requirements with numbers from 1 to 9, respectively. Robots and tasks are given a unique color based on their quality level as follows: gray for the low quality level, blue for the medium quality level, and red for the high quality level. FIG. 6 illustrates the schematic diagram of the network for the simulation experiments and FIG. 7 describes the task codification as discussed earlier.

The robots form a robotic network, and they are responsible for receiving tasks from an external agent and then allocating those tasks among themselves. As the robots in the robotic network work on the allocated tasks, they report their status (traveled distance, quality satisfaction, and load) to the external agent, which can then be used to generate the simulation results.

Table 2 shows the experimental parameters. The simulation starts by deploying the robots uniformly in the area. Then, tasks are generated following exponential inter-arrival times, uniform locations, and quality requirements. A task advertisement message is produced with each newly generated task in the area. A random robot receives the task advertisement message and considers itself the auctioneer for that task; then, the auction process occurs. The task advertisement message is sent by an external agent located outside the team of robots. It includes the details of the task (location and quality level requirement).

TABLE 2

Simulation parameters.

| Parameter | Value |
| --- | --- |
| Number of robots | 3, 6, 9, 12 |
| Number of tasks | (12, 24, 36, 48) |
| Robot's quality ($q_R$) | (2, 5, 8) |
| Task's required quality ($q_r$) | (1, 2, 3, 4, 5, 6, 8, 9) |
| Area size | 50 m × 50 m |
| Task inter-arrival mean time ($1/\lambda$) | 80 sec |
| Task execution mean time ($1/\mu$) | 140 sec |
| Task's required resources | (1, 2, 3, 4, 5, 6, 8, 9, 10) |
| PID parameters $K_p$, $K_i$, $K_d$ | (2, 0.01, 0.04) |
| $W_d$, $W_q$, $W_t$ | 0.46, 0.21, 0.33 |
| Number of Iterations | 35 |

The proposed approach is tested with different numbers of tasks (12, 24, 36 and 48 tasks) and each experiment is repeated 35 times to achieve a 95% confidence level.

Table 3 illustrates a percentage deviation from the quality satisfaction using DYMO Auction methodology.

TABLE 3

Percentage deviation from the quality satisfaction using DYMO Auction

| High | −11.7263 | −5.3375 | −5.1787 | −4.5837 |
| --- | --- | --- | --- | --- |
| Medium | −0.9240 | −4.1220 | +1.1860 | −1.1600 |
| Low | +57.0250 | +31.5650 | +23.4900 | +22.4300 |

TABLE 4

Percentage deviation from the quality satisfaction using SSI

| High | −5.2438 | −2.488 | −1.4275 | −1.7900 |
| --- | --- | --- | --- | --- |
| Medium | +1.3240 | −1.0440 | +2.7080 | +0.4400 |
| Low | +41.8550 | +32.8350 | +15.9600 | +17.2350 |

Simulation Results

The first objective is to minimize the total traveled distance per robot; this objective has a significant weight in the cost function ($W_d$=0.46). Robots also attempt to select the minimum route to visit/execute all assigned tasks, which further decreases the total traveled distance. The total traveled distance increases by 20% using DYMO-Auction compared to an SSI auction. An SSI auction requires global information about the tasks from the beginning, whereas our method assigns the tasks dynamically as they appear.

The proposed DYMO-Auction and SST auction both converge to satisfy the quality requirement for the tasks with an increase in the number of tasks. Tables 3 and 4 show that the average quality requirements of the tasks that are executed by the high-quality robots deviate in a negative direction, which indicates that the robot executes tasks that require a quality lower than that of the robot. Alternately, the opposite occurs with the robot with low quality when its tasks' average quality requirements deviate in a positive direction, meaning that the robot performs tasks with higher quality requirements. These deviations become smaller with an increase in the number of tasks because there will be more tasks of every quality level.

The load balancing objective has been met with a deviation from the optimal (the robot load for all robots is equal) by up to 2.5% for the SSI auction and up to 5% for DYMO-Auction. This indicates that the difference between any robot's load does not exceed one task in both approaches, as shown in FIGS. 10 and 11. The deviation in both methods is due to the difference between the load-balancing objective and the other two objectives, which may compromise the load objective. However, the SSI auction deviates less because it has a full view of all tasks ahead, which is not the case for DYMO-Auction. Accordingly, under DYMO approach, even though partial information is received (no master list of tasks for all tasks in the network, but rather tasks are generated in real time and robots compete to perform the task in real time, as such, dynamic requests are formed and on demand requests provide immunity against single point failures, utilizes low processing/computational costs, and perform local and global optimal solutions that take into consideration task synergy and quality considerations for the tasks and the performing robots. Accordingly, DYMO achieves comparable results to SSI at a fraction o the cost, complexity and resources required.

Experimental Setup and Results

The method was validated via a real test bed experiment using three Turtlebot2 robots. A team of three Turtlebot2 mobile robots was used in the experimental test bed.

The Turtelbot2 is a 354×354×420-mm3 two-wheeled mobile base platform. It comes with a 3D sensor for obstacle avoidance and a notebook, which is used as the interface for communicating with the robot's mobile base.

Experimental Setup

The three Turtlebot2 robots are denoted as ($R_0$, $R_1$, and $R_2$), and as in the Webots simulator, the robots have three quality levels: low, medium and high, respectively. Before the experiment, 15 task locations were specified in the experimental area (5 m×5 m). A task can appear randomly in any of these locations during the experiment, as shown in FIG. 12.

A laptop is used to generate tasks randomly in the area over the time (task location and quality requirement are variables) and send an advertisement message to a randomly selected robot. At the end of each experimental run, the robots send statistical data to the laptop, including their total travel distance, their number of assigned tasks, and their average quality satisfaction. The experiment was repeated 11 times; each time, 21 tasks were generated with an exponential inter-arrival time with a mean of 100 sec. The average robot task execution time was set to 230 sec. The results were collected and displayed with a confidence level of 90%.

Figure 14:
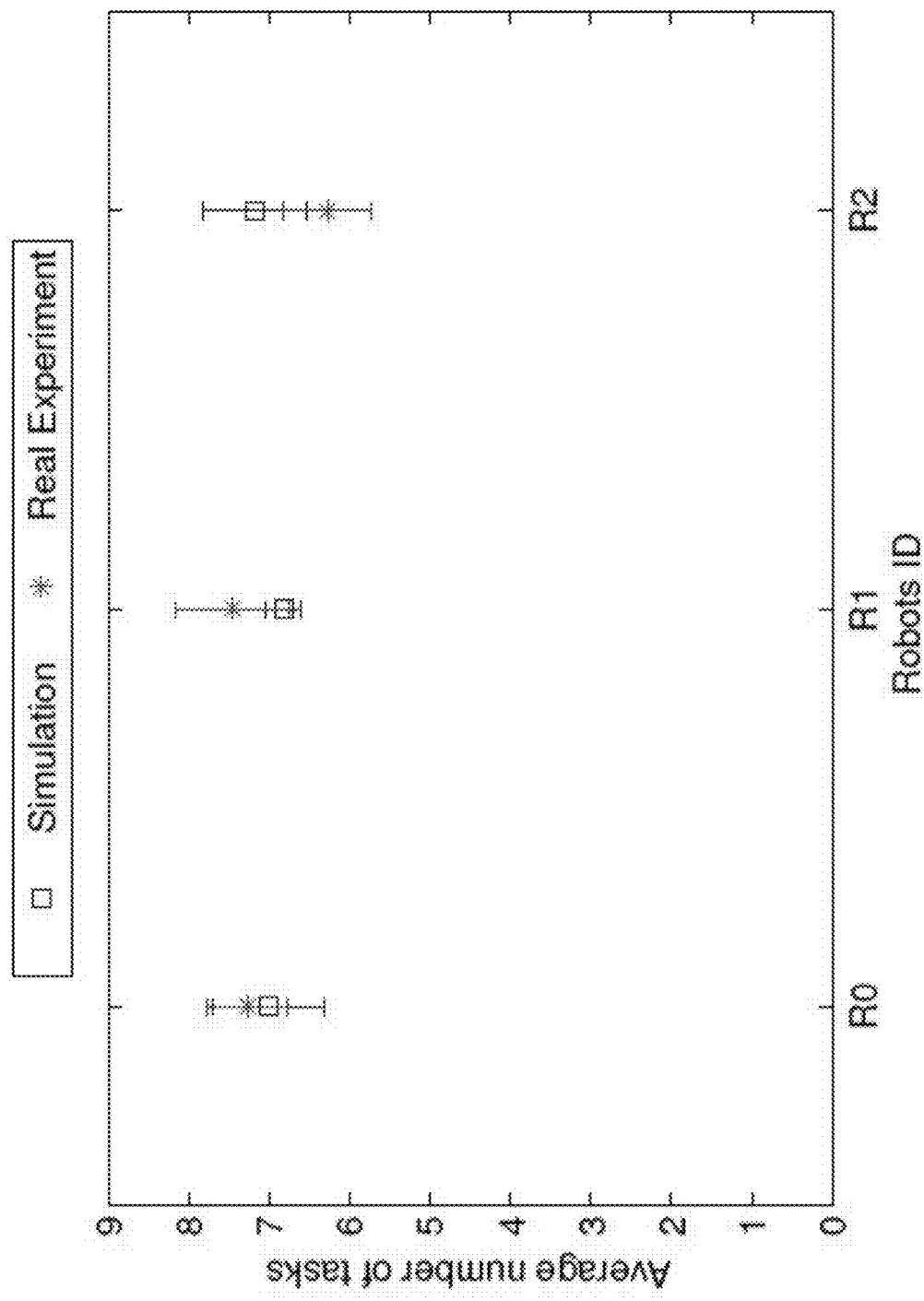
FIG. 14 illustrates an average number of tasks assigned to robots in real experimentation and in simulation according to an exemplary embodiment.
Figure 15:
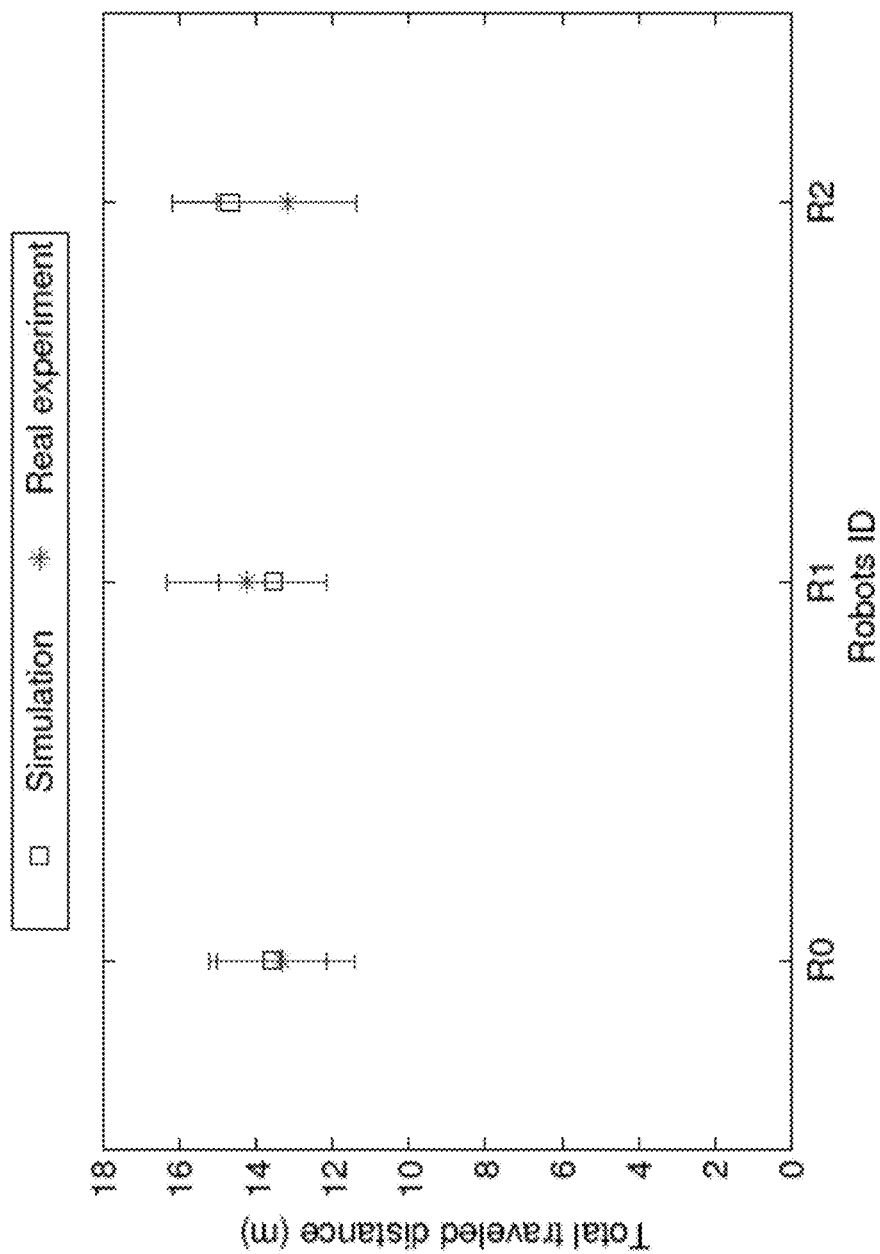
FIG. 15 illustrates an average total travelled distance per robot in real experimentation and in simulation according to an exemplary embodiment.
Figure 16:
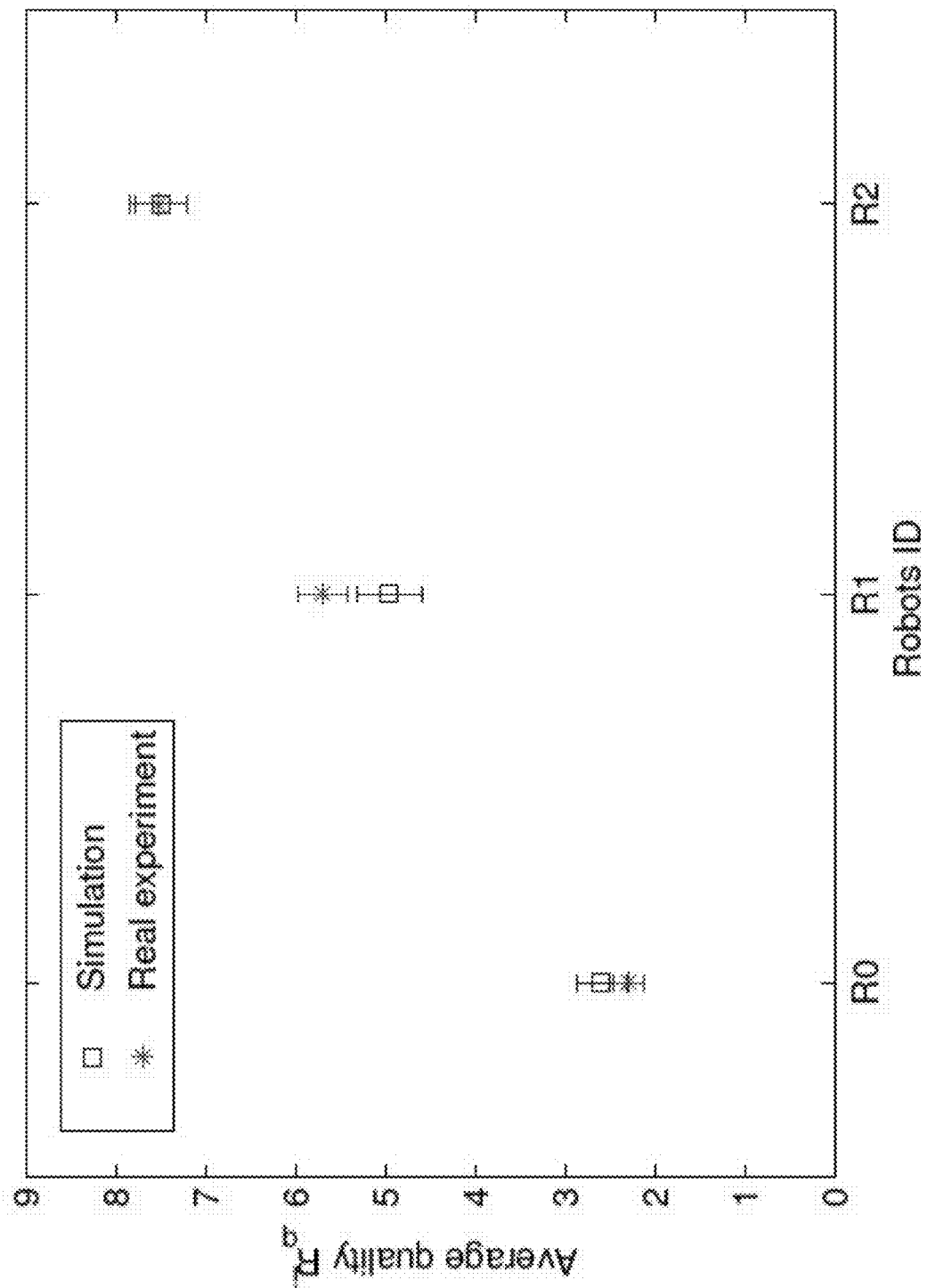
FIG. 16 illustrates an average assigned task quality per robot according to an exemplary embodiment.

To demonstrate the practicality of the proposed approach, we performed the simulation under the same real experiment parameters and present them side-by-side in FIGS. 14, 15, and 16. The experimental and simulation results are nearly identical. The proposed method successfully distributes tasks among the available robots nearly equally, as shown in FIG. 14. Consequently, robots travel the same distance on average, as shown in FIG. 15. The average quality level of assigned tasks for each robot is close to the robot's quality level, as shown in FIG. 16. This indicates that all tasks were assigned on average to a robot that satisfied their required quality level.

A quality term is used as a new factor in multi-robot task allocation (MRTA) to indicate the quality of executing a specific task. Traveled distance and workload balancing were considered in the assignment process. The MRTA problem was formulated as an auction process and behavioral process. The MRTA problem was targeted in a context where tasks appear dynamically during the mission and there is no a priori information regarding the location, quality requirements of the tasks or the positions and loads of the robots. Three objectives were included: minimize the total traveled distance, maximize the quality satisfaction, and balance the load among available robots. The MRTA was addressed as an auction process, and the DYMO-Auction approach was proposed as a distributed multi-objective task allocation approach for dynamic task allocation. The DYMO-Auction approach combines these objectives using the weighted sum model (WSM) to compute the cost function. The weights were selected and generalized to scale to any size of the problem. The proposed approach was tested extensively against the SSI method. We presented an SSI auction with global information about the tasks and robots as a comparison to DYMO-Auction, where a task appears with its information dynamically over time. The proposed DYMO-Auction approach obtained comparable results to the SSI method in terms of traveled distance, quality satisfaction, and load balancing given the limited information available compared to the SSI auction. Testbed experiments for DYMO-Auction using real Turtlebot2 robots were nearly comparable to those under the same real experimental parameters.

In one embodiment, DYMO auction may receive and process tasks while the robots are in the field and performing other tasks. Accordingly, the robots in this implementation would need to rely on task clustering, or return to a centralized location (physically, or in electronic status) in order to receive new task orders. Instead, tasks are processed in real time, collectively by the robots, and performed accordingly, based on the best suited robot in the field.

The method can be extended to form a framework that includes task waiting time and task priority. Auction approaches may suffer from communication overhead, particularly if the number of robots is large; challenges may also arise if there are a small number of bidders in the auction. As a solution, hop count can be used to expand or narrow the pool of auction process participants.

Figure 17A:
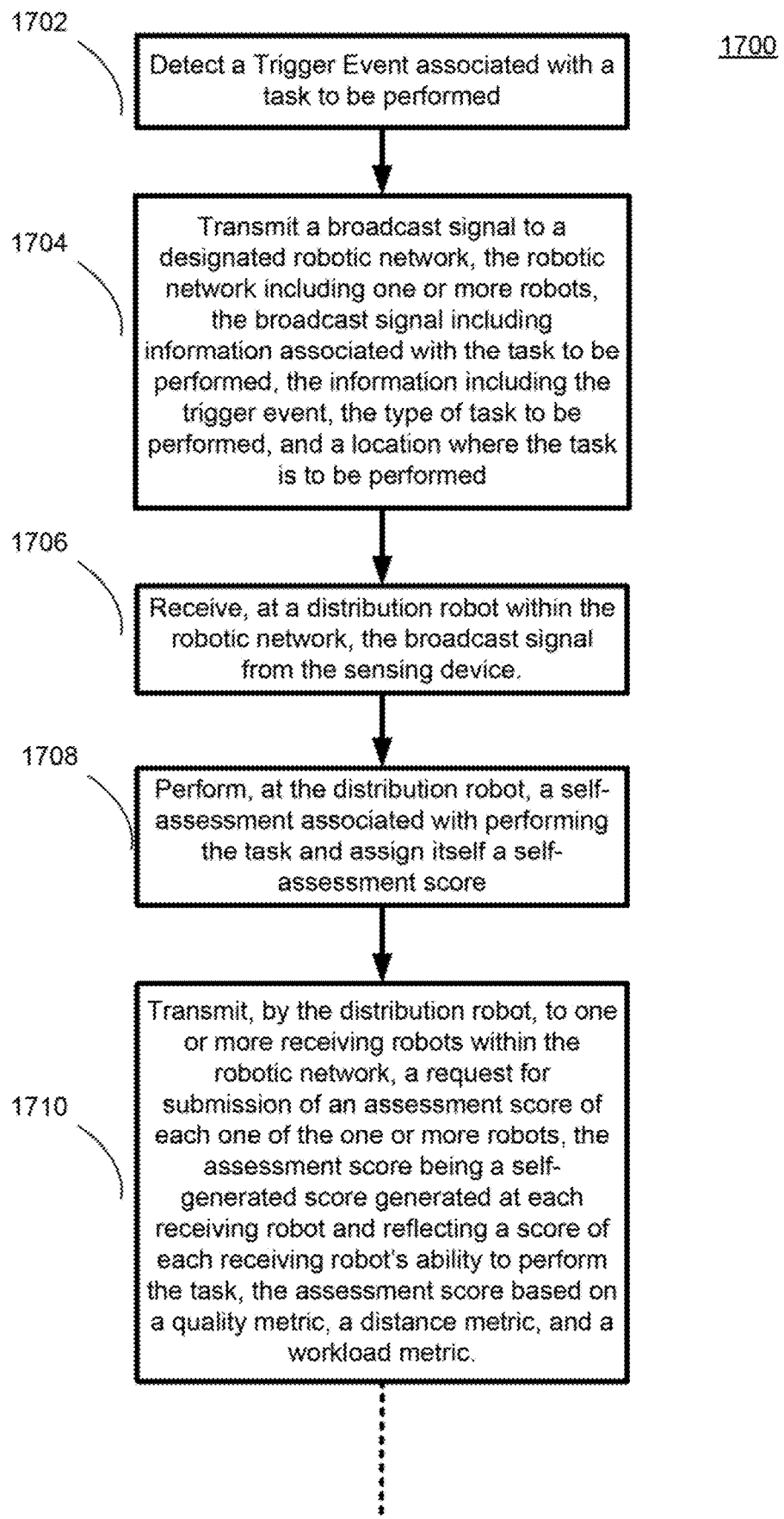
FIG. 17A illustrates a dynamic multi-objective task allocation method performed by the system according to an exemplary embodiment.
Figure 17B:
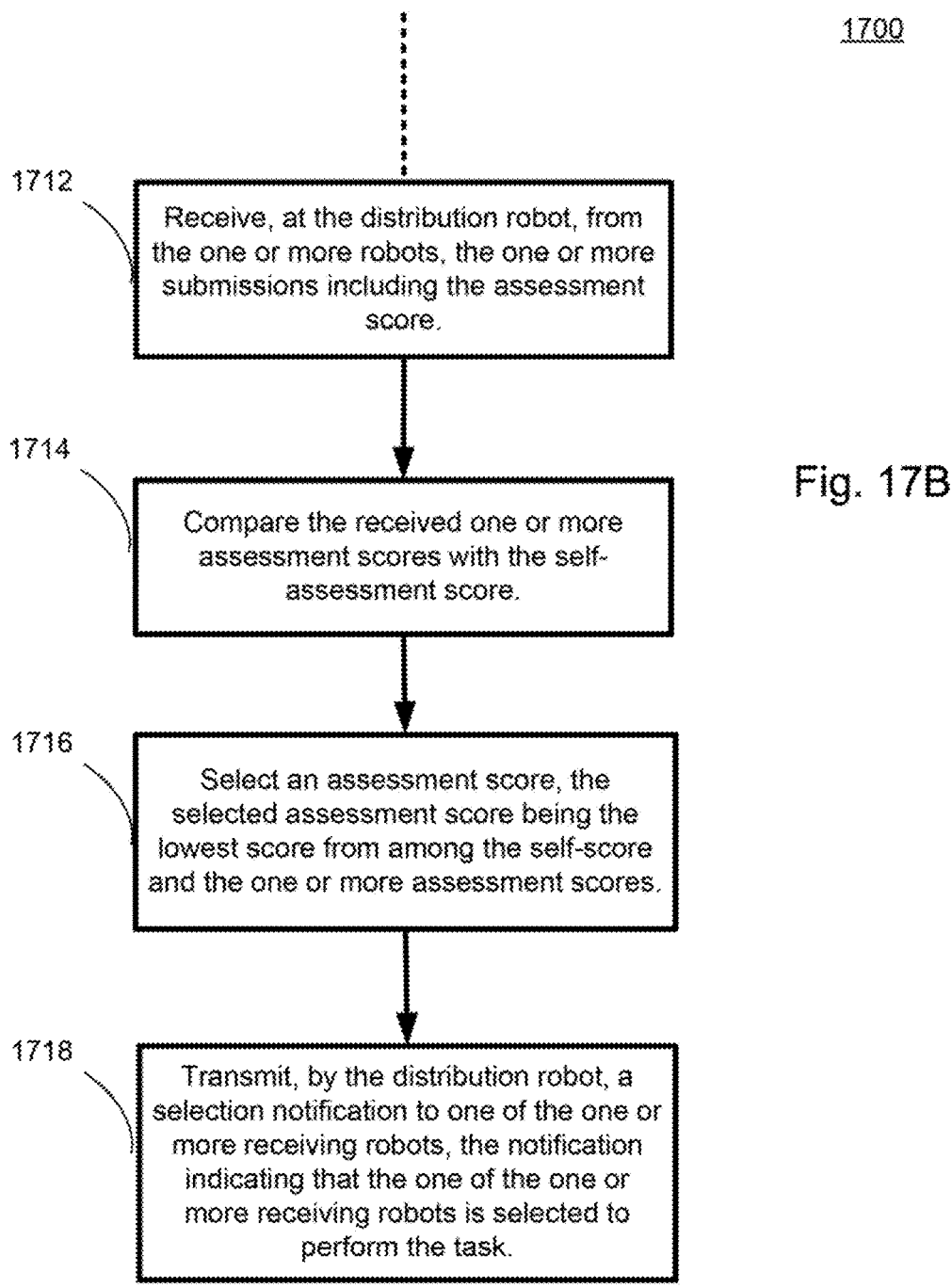
FIG. 17B illustrates a continuation of the dynamic multi-objective task allocation method performed by the system according to an exemplary embodiment.

FIGS. 17A and 17B illustrate a dynamic multi-objective task allocation method 1700 performed by the system described in FIG. 2, according to an exemplary embodiment. Method 1700 includes detecting 1702 a trigger event associated with a task to be performed. The trigger event may be detected by sensors placed on mobile objects, such as farm equipment, or other equipment placed within an predetermined environment, and configured to detect certain biological or hazardous situations. For example, the sensors may be configured to detect a biological attack or disease. Additionally, the sensors may be cameras that detect accidents, or certain situations where humans need assistance, such as overcrowding and the like. For example, a camera may detect an overcrowded area, within a stadium, an event, concert, pilgrimage or the like, and as a result, a few people may get hurt or injured. The camera can detect that people are on the floor and may need assistance or rescue. Accordingly, a trigger event associated with a task to perform a rescue operation, for example, is detected and transmitted.

The deployed sensors may transmit, 1704, a broadcast signal to a designated robotic network. The robotic network may be a network preconfigured to perform certain tasks (e.g., rescue operations) or the broadcast signal could be randomly transmitted to a plurality of robotic networks. The robotic network includes one or more robots, and the broadcast signal includes information associated with the task to be performed, the information including the trigger event (e.g., accident), the type of task to be performed (e.g., rescue) and the location where the task is to be performed (e.g. at door 3, or a spatial coordinate).

Within the robotic network, a distribution robot may receive, 1706, the broadcast signal from the deployed sensors and perform, 1708 a self-assessment associated with performing the task and assign itself the self-assessment score. Thereafter, the distribution robot may transmit, 1710, to one or more receiving robots within the robotic network, a request for submission of an assessment score of each one of the one or more robots, the assessment score being a self-generated score generated at each receiving robot and reflecting a score of each receiving robot's ability to perform the task. In one example, the assessment score may be determined based on a quality metric, a distance metric and a workload metric of each receiving robot.

The receiving robots then may transmit, and the distribution robot may receive 1712, the one or more submissions including the assessment score. Thereafter, the distribution robot may compare, 1714, the received one or more assessment scores with the self-assessment score and select one assessment score 1716. In one example, the selected assessment score may be the lowest score from among the self-assessment score and the one or more assessment scores. The distribution robot may then transmit, 1718, a selection notification to one of the one or more receiving robots, the notification indicating that the one of the one or more receiving robots is selected to perform the task.

Figure 18:
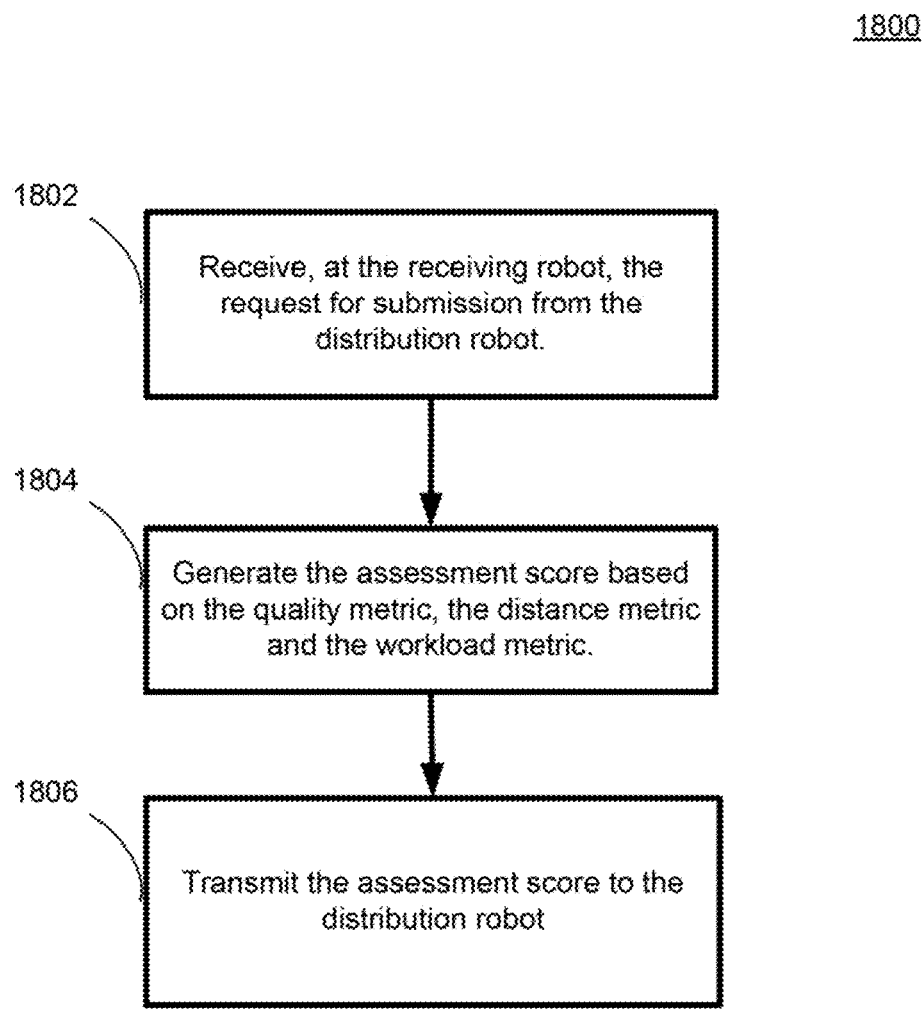
FIG. 18 illustrates a receiving method according to an exemplary embodiment.

FIG. 18 illustrates a receiving method 1800 according to an exemplary embodiment. In one example, a receiving robot may receive, 1802, the request for submission from the distribution robot. This request for submission may be received through a broadcast signal, a unicast signal or the like, and may be received through a wide area network or a local area network. Once received, the receiving robot then generates, 1804, an assessment score based on a quality metric, a distance metric and a workload metric of the robot. As previously discussed, the quality metric may be based on a quality score associated with the robot (e.g., camera specifications (4 megapixels or 20 megapixels)) and a quality score associated with the task (e.g., low resolution picture needed, or high resolution video image needed, or the like).

The distance metric may be based on a determined distance between the robot and the task at a predetermined time incident. The predetermined time incident may be a time of when the robot receives the request for submission transmission. Alternatively, the predetermined time incident may be a period in which the robot may be able to perform the task. For example, assuming two robots (R1 and R2) receive the request for submission for performing a task, and presently R1 is closer in distance to the task than R2, then R1 would have a better likelihood of being selected to perform the task (based solely on distance), if the time period is measured at a time of receiving the task request. Alternatively, if the time period is at a future time, and R2 may be performing a future task that is closer to the task than R1's future predicted location, then R2 would have the better likelihood of being selected to perform the task (based solely on distance, again).

A workload metric may include the current workload of the robot, as determined based on a task matrix (e.g. schedule) for example. In one embodiment, if R1 has four scheduled tasks while R2 has three scheduled tasks, then R2's work load would receive higher favorability R1 (based solely on workload). Once the assessment score is calculated, the assessment score is then transmitted 1806 to the distribution robot.

Figure 19:
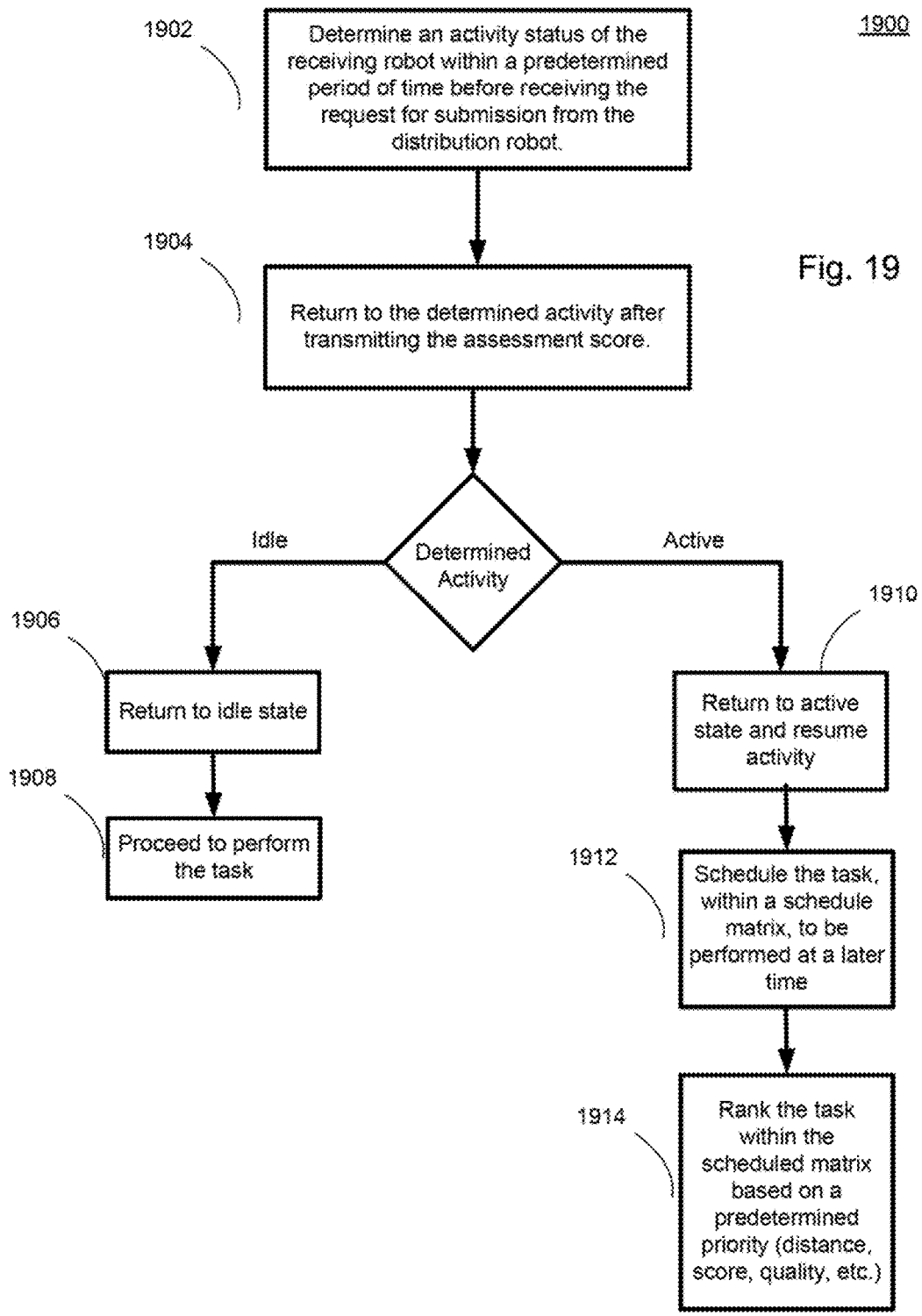
FIG. 19 illustrates a determination method for how a receiving robot receives, performs and schedules tasks according to an exemplary embodiment.

In yet another embodiment, FIG. 19 illustrates a determination method for how a receiving robot receives, performs and schedules tasks 1900 according to an exemplary embodiment. For example, a receiving robot may determine an activity status within a predetermined period of time before receiving the request for submission from the distribution robot. In such a case, the receiving robot may register its current activity upon receiving the request for submission transmission. In doing so, the receiving robot can determine to what state it would return to 1904, once the assessment score is calculated and submitted, as previously discussed. For example, if the determined activity is idle, then the robot may return to the idle state and if selected, proceed to perform the task immediately.

Alternatively, if the receiving robot is currently in an active state (i.e. already performing a task at the time it receives a request for submission for a new task), then the robot returns 1910 to the activity state and resumes the activity once the robot transmits its assessment score. Furthermore, if the robot is selected, then the robot will schedule 1912 the task within a schedule matrix to be performed at a later time. The schedule matrix may include a matrix association of scheduled tasks, times and priorities of the tasks. The priorities may be based on different matrices, including, for example, distance, quality, urgency of the task, and the like. Accordingly, after scheduling the task, the receiving robot may then rank the task within the scheduled matrix based on these predetermined priorities.

Although the preferred embodiments of the present disclosure have been described in detail with reference to the appended drawings, the present disclosure is not limited thereto. It is obvious to those skilled in the art that various modifications or variations are possible insofar as they are within the technical scope of the appended claims or the equivalents thereof. It should be understood that such modifications or variations are also within the technical scope of the present disclosure.

The invention claimed is:

1. A task assignment method for a robotic network of a plurality of wheeled robots using dynamic multi-objective task allocation within the robotic network to assign one or more tasks in real-time as the tasks are detected,
wherein the wheeled robots have a wheeled mobility platform and at least one navigation sensor selected from the group of an infrared navigation sensor, an ultrasound navigation sensor and a camera navigation sensor;
the dynamic multi-objective task allocation method comprising:
detecting, with a sensing device, a trigger event, the trigger event being associated with a task to be performed;

transmitting, by the sensing device, a broadcast signal to a designated robotic network, the robotic network including one or more robots, the broadcast signal including information associated with the task to be performed, the information including the trigger event, the type of task to be performed, and a location where the task is to be performed;

receiving, at a distribution robot within the robotic network, the broadcast signal from the sensing device;

performing, at the distribution robot, a self-assessment associated with performing the task and assigning itself a self-assessment score;

transmitting, by the distribution robot, to one or more receiving robots within the robotic network, a request for submission of an assessment score of each one of the one or more robots, the assessment score being a self-generated score generated at each receiving robot and reflecting a score of each receiving robot's ability to perform the task, the assessment score based on a quality metric, a distance metric, and a workload metric;

receiving one or more submissions from the one or more robots, the one or more submissions including the assessment score;

comparing the received one or more assessment scores with the self-assessment score; and selecting a robot to perform the task based on the lowest received assessment score from among the self-score and the one or more assessment scores.

2. The dynamic multi-objective task allocation method according to claim 1, further comprising:

transmitting, by the distribution robot, a selection notification to the selected robot, the notification indicating that the selected robot is selected to perform the task.

3. The dynamic multi-objective task allocation method according to claim 2, further comprising receiving, at a robot within the robotic network, the request for submission from the distribution robot, generating the assessment score based on the quality metric, the distance metric and the workload metric, and transmitting the assessment score to the distribution robot.

4. The dynamic multi-objective task allocation method according to claim 3, further comprising:

determining, at the receiving robot, an activity status of the receiving robot within a predetermined period of time before receiving the request for submission from the distribution robot; and returning to the determined activity after transmitting the assessment score, wherein the receiving robot returns to an idle state in response to the determined activity being an idle activity, and the receiving robot returns to a task performing state in response to the determined activity being a task performing activity.

5. The dynamic multi-objective task allocation method according to claim 4, further comprising:

in response to receiving the selection notification from the distribution robot, proceed, at the receiving robot, to perform the task, when the determined activity status is the idle sate, and scheduling the task, within a schedule matrix, when the determined activity status is the task performing state.

6. The dynamic multi-objective task allocation method according to claim 5, wherein a priority of the scheduled task is based on a ranking of the scheduled task within the schedule matrix.

* * * * *